US012688990B2

(12) United States Patent
Takahashi et al.

(10) Patent No.: US 12,688,990 B2
(45) Date of Patent: Jul. 21, 2026

(54) OZONE-GENERATING APPARATUS

(71) Applicant: METAWATER Co., Ltd., Tokyo (JP)

(72) Inventors: Ryutaro Takahashi, Chiyoda-ku (JP);
Daisuke Inoue, Chiyoda-ku (JP)

(73) Assignee: METAWATER Co., Ltd., Tokyo (JP)

( * ) Notice: Subject to any disclaimer, the term of this
patent is extended or adjusted under 35
U.S.C. 154(b) by 28 days.

(21) Appl. No.: 18/776,290

(22) Filed: Jul. 18, 2024

(65) Prior Publication Data

US 2024/0371592 A1 Nov. 7, 2024

Related U.S. Application Data

(63) Continuation of application No.
PCT/JP2022/040082, filed on Oct. 27, 2022.

(30) Foreign Application Priority Data

Feb. 25, 2022 (JP) ................................. 2022-028592

(51) Int. Cl.
*H01J 1/90* (2006.01)
*C01B 13/11* (2006.01)
(Continued)

(52) U.S. Cl.
CPC .............. *H01J 1/92* (2013.01); *C01B 13/115*
(2013.01); *C02F 1/50* (2013.01); *H01J 1/90*
(2013.01);
(Continued)

(58) Field of Classification Search
CPC .... H01J 1/90; H01J 1/92; C01B 13/11; C01B
13/115; C01B 2201/14; C01B 2201/22;
(Continued)

(56) References Cited

U.S. PATENT DOCUMENTS 5,034,198 A * 7/1991 Kaiga ..................... C01B 13/11
422/186.18
6,027,701 A * 2/2000 Ishioka ................... C01B 13/11
204/176
(Continued)

FOREIGN PATENT DOCUMENTS

CN 105849037 A 8/2016
CN 210140434 U 3/2020
(Continued)

OTHER PUBLICATIONS

International Search Report issued on Jan. 10, 2023, in correspond-
ing International Application No. PCT/JP2022/040082; 5 pages.
(Continued)

*Primary Examiner* — Tung X Le
(74) *Attorney, Agent, or Firm* — Maier & Maier, PLLC

(57) ABSTRACT

An ozone-generating apparatus includes: a plurality of dis-
charge tubes each including: a first electrode having a
tubular shape extending along a first axis; a second electrode
extending along the first axis; and a dielectric extending
along the first axis and disposed between the first electrode
and the second electrode, the plurality of discharge tubes
including a first discharge tube and a second discharge tube
adjacent to the first discharge tube; and a connecting mem-
ber electrically connecting the second electrode of the first
discharge tube to the second electrode of the second dis-
charge tube. The connecting member faces an end of the
dielectric of the first discharge tube and an end of the
dielectric of the second discharge tube.

5 Claims, 17 Drawing Sheets

(51) Int. Cl.
    *C02F 1/50*            (2023.01)
    *H01J 1/92*           (2006.01)

(52) U.S. Cl.
    CPC ...... *C01B 2201/22* (2013.01); *C01B 2201/32*
         (2013.01); *C02F 2201/782* (2013.01); *C02F*
         *2303/02* (2013.01); *C02F 2303/04* (2013.01)

(58) Field of Classification Search
    CPC ... C01B 2201/32; C01B 2201/48; C02F 1/50;
             C02F 2201/782; C02F 2303/02; C02F
                                 2303/04
    See application file for complete search history.

(56) References Cited

U.S. PATENT DOCUMENTS

| | | | | |
|---|---|---|---|---|
| 6,193,852 | B1 * | 2/2001 | Caracciolo | C01B 13/11 |
| | | | | 422/186.2 |
| 6,264,897 | B1 * | 7/2001 | Ishioka | C01B 13/11 |
| | | | | 422/186.07 |
| 2003/0121770 | A1 * | 7/2003 | McNulty, Jr. | A61L 2/202 |
| | | | | 204/176 |
| 2012/0156106 | A1 * | 6/2012 | Murata | C01B 13/11 |
| | | | | 422/186.2 |

| | | | | |
|---|---|---|---|---|
| 2015/0239737 | A1 * | 8/2015 | Takahashi | C01B 13/115 |
| | | | | 422/186.18 |
| 2017/0158507 | A1 * | 6/2017 | Nakatani | H05H 1/2406 |
| 2019/0367362 | A1 * | 12/2019 | Hashimoto | C01B 13/11 |

FOREIGN PATENT DOCUMENTS

| | | |
|---|---|---|
| EP | 3805151 A1 | 4/2021 |
| JP | 2015-151311 A | 8/2015 |
| JP | 2018131368 A | 8/2018 |
| WO | 2015122132 A1 | 8/2015 |
| WO | 2019/229865 A1 | 12/2019 |

OTHER PUBLICATIONS

Written Opinion issued on Jan. 10, 2023, in corresponding International Application No. PCT/JP2022/040082; 6 pages.
Office Action issued on Oct. 1, 2025, in corresponding Canadian Application No. 3,253,217, 4 pages.
Extended Search Report issued on Sep. 8, 2025, in corresponding European Application No. 22928856.8, 8 pages.
Office Action issued on Apr. 17, 2026, in corresponding Chinese Application No. 202280090857.X, 10 pages.
Office Action issued on Mar. 3, 2026, in corresponding Japanese Application No. 2024-502818, 5 pages.

* cited by examiner

OZONE-GENERATING APPARATUS

CROSS-REFERENCE TO RELATED APPLICATION

This application is a continuation of International Application No. PCT/JP2022/040082, filed on Oct. 27, 2022, now pending, herein incorporated by reference. Further, this application is based upon and claims the benefit of priority from the prior Japanese Patent Application No. 2022-028592, filed on Feb. 25, 2022, the entire contents of which are incorporated herein by reference.

FIELD

The present disclosure relates to an ozone-generating apparatus.

BACKGROUND

Water treatment such as decolorization, deodorization, and sterilization of water and sewage water may be performed using ozone. Patent Literature 1 discloses an example of an ozone-generating apparatus.

CITATION LIST

PATENT LITERATURE

Patent Literature 1: WO 2019/229865

SUMMARY

A structure is proposed in which a voltage is applied to a plurality of electrodes in an ozone-generating apparatus such as the aforementioned apparatus.

According to an aspect of the embodiments, an ozone-generating apparatus includes: a plurality of discharge tubes each including: a first electrode having a tubular shape extending along a first axis; a second electrode extending along the first axis; and a dielectric extending along the first axis and disposed between the first electrode and the second electrode, the plurality of discharge tubes including a first discharge tube and a second discharge tube adjacent to the first discharge tube; and a connecting member electrically connecting the second electrode of the first discharge tube to the second electrode of the second discharge tube, wherein the connecting member faces an end of the dielectric of the first discharge tube and an end of the dielectric of the second discharge tube.

According to the ozone-generating apparatus according to one aspect of the present disclosure, a voltage can be applied to a plurality of electrodes.

DETAILED DESCRIPTION

Embodiments of the present disclosure will be described below with reference to the drawings. However, such description should not be construed in limiting meanings and does not limit the claimed subject matter. Various changes, substitutions, and modifications can be made without departing from the gist and scope of the present disclosure. Different embodiments can be combined as appropriate.

Ozone-Generating Apparatus 100 in First Embodiment

Figure 1:
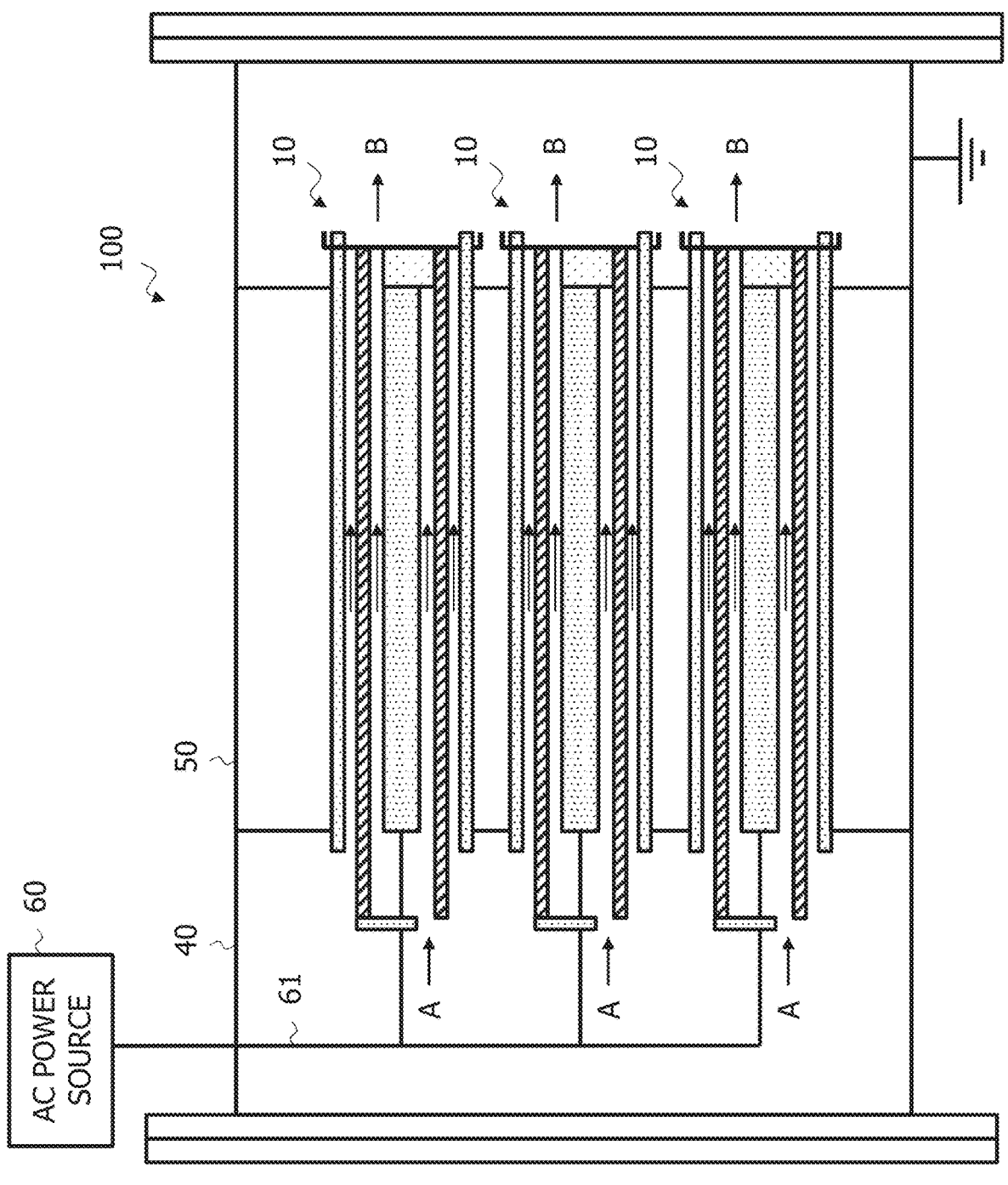
FIG. 1 is a side cross-sectional view of the ozone-generating apparatus 100 in the first embodiment.
Figures 2A, 2B:
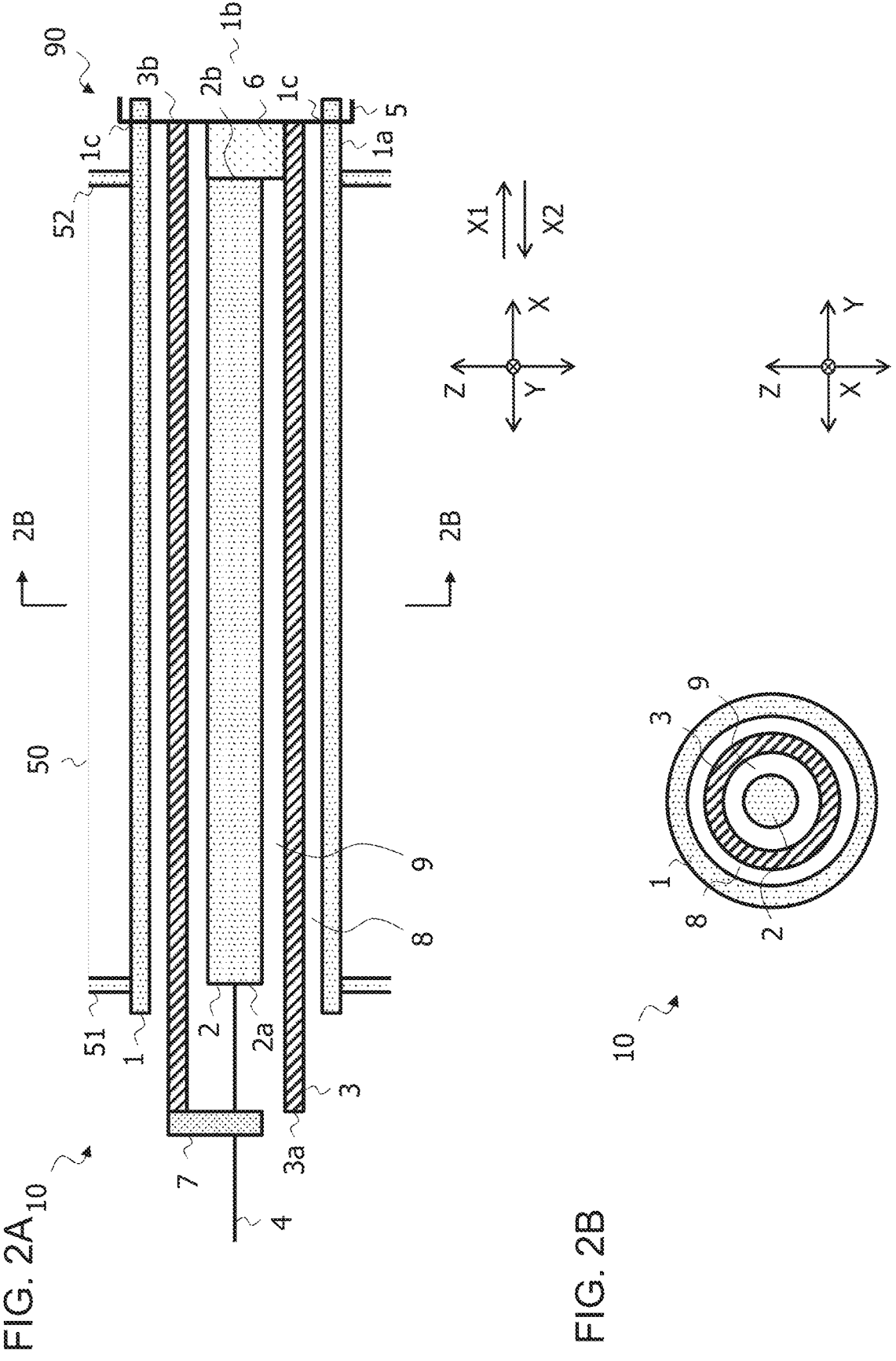
FIGS. 2A and 2B illustrate a configuration example of a discharge tube 10 in the first embodiment.
Figures 3A, 3B:
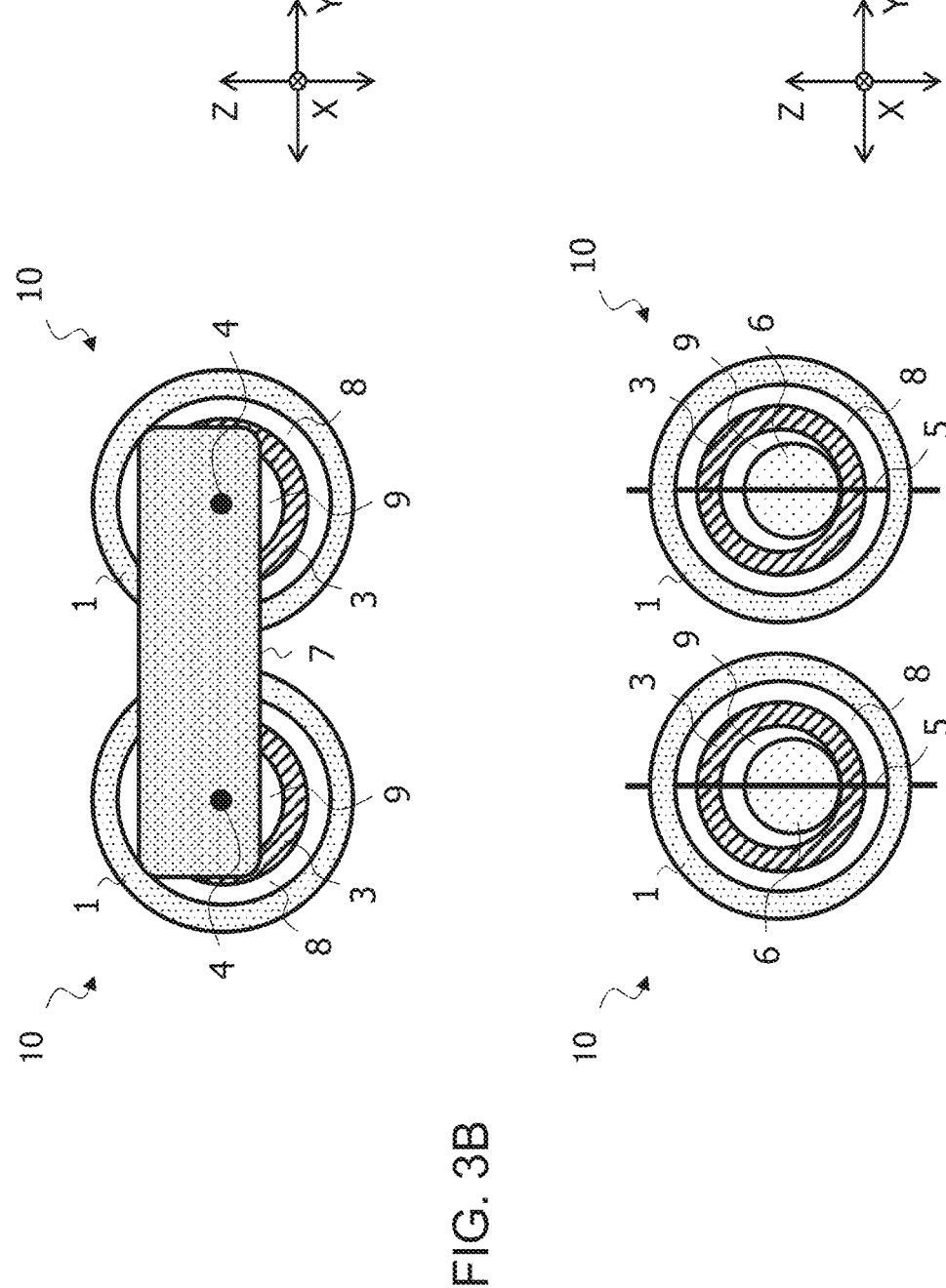
FIGS. 3A and 3B illustrate a configuration example of a member 5 (hereinafter also referred to as a pin member 5), an insulating member 6, and a power supply ribbon 7 (hereinafter also referred to as a connecting member 7) in the first embodiment.
Figures 4A, 4B:
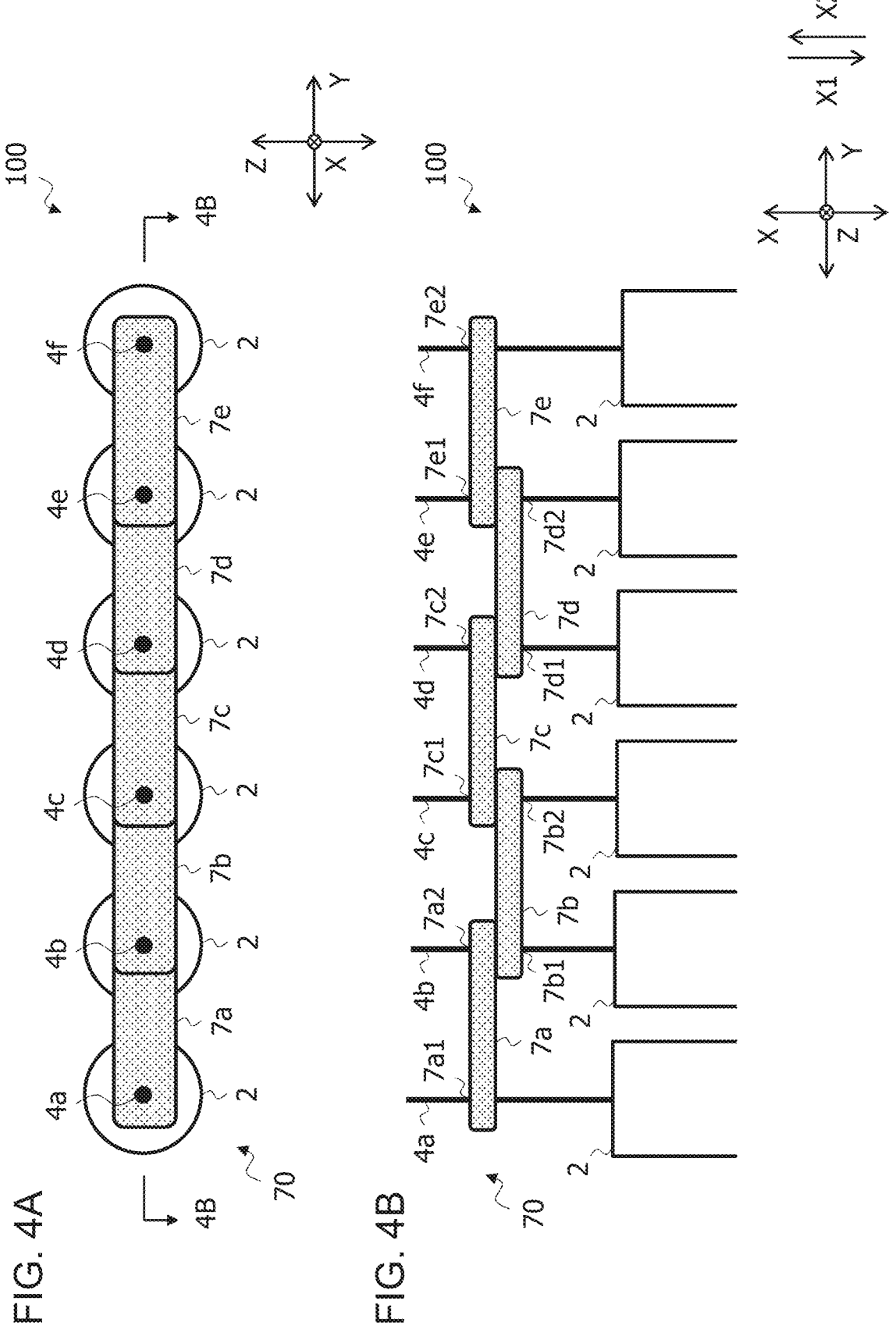
FIGS. 4A, 4B and 5 illustrate a configuration example of power supply ribbons 7 in the first embodiment.
Figure 5:
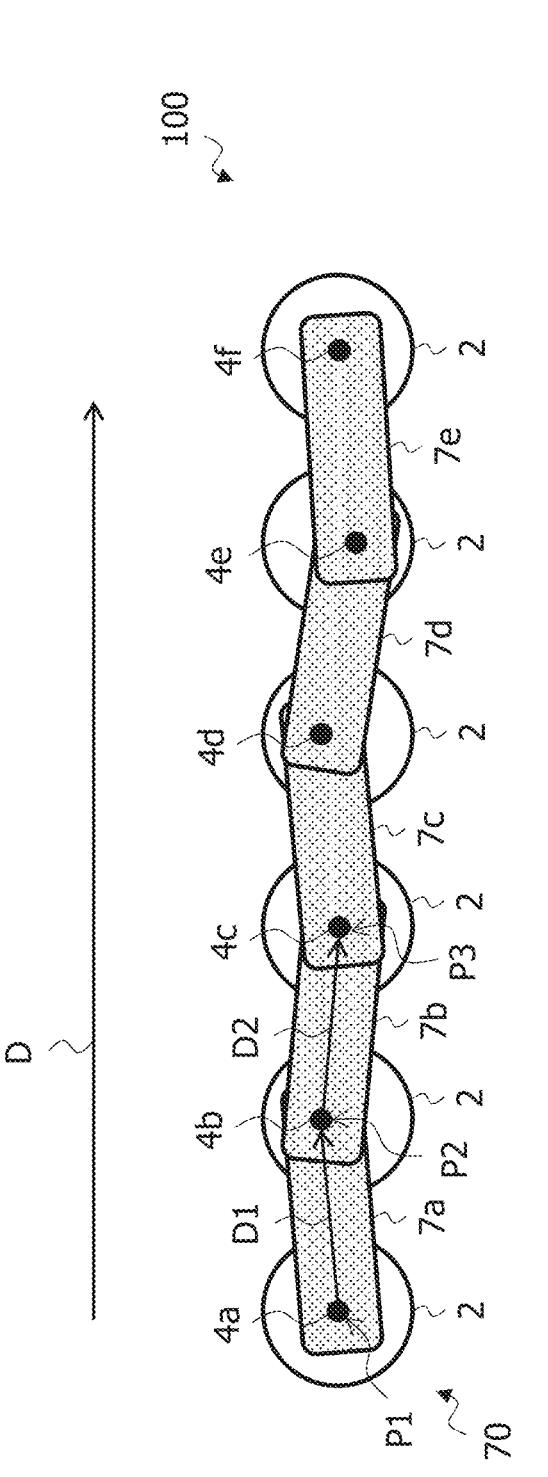
Figure 5:
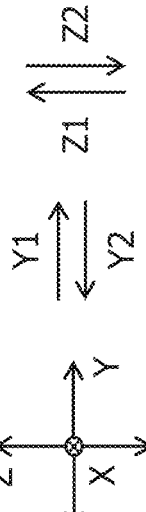

First, an ozone-generating apparatus 100 in the first embodiment is described. FIG. 1 is a side cross-sectional view of the ozone-generating apparatus 100 in the first embodiment. FIG. 2 illustrates a configuration example of a discharge tube 10 in the first embodiment. Specifically, FIG. 2A is a side cross-sectional view of the discharge tube 10, and FIG. 2B is a 2B-2B cross-sectional view of the discharge tube 10. FIG. 3 illustrates a configuration example of a member 5 (hereinafter also referred to as a pin member 5), an insulating member 6, and a power supply ribbon 7 (hereinafter also referred to as a connecting member 7) in the first embodiment. Specifically, FIG. 3A is a front view (a view from an X1 direction in the example of FIG. 1) of two discharge tubes 10 next to each other in a Y-axis direction, and FIG. 3B is a back view (a view from an X2 direction in the example of FIG. 1) of the two discharge tubes 10 next to each other in the Y-axis direction. FIGS. 4 and 5 illustrates a configuration example of power supply ribbons 7 in the first embodiment. Specifically, FIGS. 4A and 5 is a front view of six discharge tubes 10 arranged along the Y-axis direction, and FIG. 4B is a 4B-4B cross-sectional view of the six discharge tubes 10 arranged along the Y-axis direction. Note that the example in FIG. 4 only depicts inner electrodes 2, power supply members 4, and the power supply ribbons 7.

The ozone-generating apparatus 100 includes, for example, a plurality of discharge tubes 10, a housing 40, a cooling unit 50, and an AC power source 60 (hereinafter also referred to simply as a power source 60), as depicted in FIG. 1.

The housing 40 is, for example, a housing that accommodates one or more discharge tubes 10. The housing 40 has, for example, an inlet (not depicted) for source gas A containing at least oxygen, and an outlet (not depicted) for ozone gas B. The housing 40 has, for example, through-holes (not depicted) through which power supply lines 61 extend that connect the AC power source 60, which is disposed outside the housing 40, to the respective discharge tubes 10. Note that the housing 40 may be grounded as depicted in FIG. 1.

Each of the discharge tubes 10 produces the ozone gas B by means of barrier discharge in response to the inflow of the source gas A from the side in the X2 direction, and releases the produced ozone gas B from the side in the X1 direction, as indicated by solid arrows in FIG. 1, for example. That is, the source gas A flows in from the left side of the X-axis, and the ozone gas B is released from the right side of the X-axis. The ozone gas B is used in water treatment such as decolorization, deodorization, and sterilization of water and sewage water, for example.

Each of the discharge tubes 10 includes, for example, an outer electrode 1, an inner electrode 2, a dielectric 3, a power supply member 4, a pin member 5, an insulating member 6, and a power supply ribbon 7, as depicted in FIGS. 2A and 2B. Hereinafter, the pin member 5, the insulating member 6, and the power supply ribbon 7 are also referred to collectively as an inhibiting member 90.

The outer electrode 1 (hereinafter also referred to as a first electrode 1) is an electrode located outward of the dielectric 3, and is, for example, a conductor tube (e.g. a metal tube made of stainless steel or the like) having two end portions in the X-axis direction that are supported by tube sheets 51 and 52. The outer electrode 1 has, for example, a cylindrical shape that extends from the side in the X2 direction toward the side in the X1 direction (i.e. the axial direction of the outer electrode 1 is parallel with the X-axis) and has both ends open. The outer electrode 1 functions as a ground electrode by being grounded by a ground line (not depicted), for example. Hereinafter, the axis of the outer electrode 1 is also referred to as a first axis, and the axial direction of the outer electrode 1 is also referred to as a first axis. Hereinafter, an end portion of the outer electrode 1 on the side in the X1 direction is also referred to as an end portion 1a.

A region surrounded by an outer circumferential face of the outer electrode 1 and the tube sheets 51 and 52 constitutes the cooling unit 50 for allowing a coolant, such as cooling water, to flow through.

The inner electrode 2 (hereinafter also referred to as a second electrode 2) is an electrode located inward of the dielectric 3, and is, for example, a conductor tube (e.g. a metal tube made of stainless steel or the like) disposed on the inner circumferential side of the outer electrode 1. The inner electrode 2 extends, for example, from the side in the X2 direction side toward the side in the X1 direction (i.e. the axial direction of the inner electrode 2 is parallel with the X-axis), and has cylindrical shape coaxial with the outer electrode 1. The inner electrode 2 functions as a high-voltage electrode by connecting to the AC power source 60, for example. Hereinafter, an end portion of the inner electrode 2 on the side in the X2 direction is also referred to as an end portion 2a or a first end 2a, and an end portion of the inner electrode 2 on the side in the X1 direction is also referred to as an end portion 2b or a second end 2b.

The dielectric 3 is, for example, a glass tube having a cylindrical shape coaxial with the outer electrode 1. The dielectric 3 extends, for example, from the side in the X2 direction toward the side in the X1 direction (i.e. the axial direction of the dielectric 3 is parallel with the X-axis), and has both ends open. The dielectric 3 is disposed at a position spaced apart from the inner circumferential face of the outer electrode 1 and the outer circumferential face of the inner electrode 2, for example. Hereinafter, an end portion of the dielectric 3 on the side in the X2 direction is also referred to as an end portion 3a or a first end 3a, and an end portion of the dielectric 3 on the side in the X1 direction is also referred to as an end portion 3b or a second end 3b.

Specifically, the dielectric 3 is disposed such that, for example, a gap functioning as a discharge space 8 is formed between the dielectric 3 and the inner circumferential face of the outer electrode 1. Further, the dielectric 3 is disposed such that, for example, a gap functioning as a discharge space 9 is formed between the dielectric 3 and the outer circumferential face of the inner electrode 2.

The power supply member 4 is, for example, a bar-shaped power supply rod, and extends in the X-axis direction from the side in the X2 direction side (the power supply line 61 in FIG. 1) to the end portion 2a of the inner electrode 2 on the side in the X2 direction. The power supply member 4 applies a voltage (AC voltage) from the AC power source 60 to the inner electrode 2 by electrically connecting to the inner electrode 2, for example.

That is, the ozone-generating apparatus 100 in the present embodiment includes, for example, at least one discharge tube 10 each including the tubular outer electrode 1 extending along the first axis (X-axis in FIG. 1), the inner electrode 2 extending along the first axis, and the dielectric 3 extending along the first axis and disposed between the outer electrode 1 and the inner electrode 2. In each discharge tube 10 in the present embodiment, the outer side of the dielectric 3 faces the inner side of the outer electrode 1 with a first distance therebetween, and the inner side of the dielectric 3 faces the outer side of the inner electrode 2 with a second distance therebetween, for example.

Next, the pin member 5 is described. The pin member 5 is made of metal such as stainless steel. The pin member 5 is in contact with the outer electrode 1 at the end portion 1a (opening portion 1b) of the outer electrode 1 on the side in the X1 direction due to extending in the radial direction of the outer electrode 1 (hereinafter also referred to simply as a radial direction) as depicted in FIGS. 2A and 3B, and inhibits the dielectric 3 from moving in the X1 direction, for example. That is, the pin member 5 inhibits the dielectric 3 from moving in the X1 direction farther than the pin member 5, for example. Note that the pin member 5 may alternatively be made of a nonmetal having a certain strength and ozone resistance, for example.

Specifically, the outer electrode 1 has, for example, two holes 1c along the radial direction at the end portion 1a (a wall forming the end portion 1a). Two ends of the pin member 5 are each inserted into a corresponding one of the two holes 1c, for example. The two ends of the pin member 5 are located on the outer circumferential side of the outer electrode 1, and are bent in a direction (e.g. the X1 direction) different from the extending direction (radial direction) of the pin member 5, for example. The pin member 5 is thus fixed to the outer electrode 1, for example.

That is, the source gas A flows into the discharge spaces 8 and 9 from the side in the X2 direction toward the side in the X1 direction during operation of the ozone-generating apparatus 100 (while ozone is produced), for example. If, for example, the dielectric 3 is not fixed to the outer electrode 1 or any other member relative to the X axis (i.e. if the dielectric 3 is not fixed relative to the horizontal direction of the sheet of FIG. 1) as depicted in FIG. 1 and other figures, it is possible that the dielectric 3 moves in the X1 direction in the discharge tube 10 in response to the inflow of the source gas A. In addition, when, for example, the ozone-generating apparatus 100 is transported by a vehicle or the like, it is also possible that the dielectric 3 moves in the X1 direction in response to the vehicle or the like starting or stopping. Note that it is also possible that the dielectric 3 moves in the X2 direction, and this case will be described later.

Each discharge tube 10 in the present embodiment includes, for example, the inhibiting member 90 that is disposed on an end side (e.g. the side in the X1 direction) of the outer electrode 1 and inhibits at least either the inner electrode 2 or the dielectric 3 from moving toward the end side (e.g. in the X1 direction). The inhibiting member 90 faces, for example, an end (e.g. the end portion 2b) of the inner electrode 2 and an end (e.g. the end portion 3b) of the dielectric 3. The inhibiting member 90 may come in contact with at least one of the ends (e.g. the end portion 2b and the end portion 3b) of the inner electrode 2 and the dielectric 3, for example.

Specifically, the outer electrode 1 in the present embodiment is, for example, an electrode tube having both ends open. The inner electrode 2 has the end portion 2a and the end portion 2b. The dielectric 3 has a tubular shape and has the end portion 3a and the end portion 3b. The inhibiting member 90 has the pin member 5 having a portion extending in the radial direction of the outer electrode 1. The pin member 5 is in contact with the outer electrode 1 and faces the end portion 3b of the dielectric 3.

More specifically, the outer electrode 1 in the present embodiment has, for example, two holes 1c along the radial direction in the wall of the outer electrode 1. Two ends of the pin member 5 are inserted into the two holes 1c. Portions of the pin member 5 that are located outward of the outer electrode 1 are bent in a direction different from the radial direction. The pin member 5 faces the end portion 2b of the inner electrode 2, for example. The pin member 5 may also come into contact with the end portion 3b of the dielectric 3, for example.

The pin member 5 makes it possible for the ozone-generating apparatus 100 in the present embodiment to inhibit the dielectric 3 from moving (in the X1 direction) during operation and transportation of the ozone-generating apparatus 100, for example.

Specifically, the dielectric 3 depicted in FIG. 1 and other figures has a cylindrical shape, for example. This configuration makes it possible to dispose the pin member 5 on the side in the X1 direction relative to the dielectric 3 in the ozone-generating apparatus 100 in the present embodiment, by installing the pin member 5 so as to cross the opening portion 1b, for example. It is thus possible to bring at least a part of the end portion 3b of the dielectric 3 on the side in the X1 direction into contact with the pin member 5 when the dielectric 3 moves in the X1 direction, even without the later-described insulating member 6. The pin member 5 in the present embodiment can thus inhibit the dielectric 3 from moving in the X1 direction farther than the pin member 5, for example.

Note that the example depicted in FIG. 2 and other figures illustrates the case where the discharge tube 10 has a linear pin member 5. However, the discharge tube 10 may have, instead of the pin member 5, a member 5 that has, for example, a circular, elliptical, polygonal, or plate shape as viewed from at least any of the X-axis direction, the Y-axis direction and the Z-axis direction.

Next, the insulating member 6 is described. The insulating member 6 is, for example, an insulator such as glass, ceramics, or the like. The insulating member 6 is, for example, disposed at a position in contact with the pin member 5 and facing the end portion 2b of the inner electrode 2 at the end portion 1a of the outer electrode 1 on the side in the X1 direction, as depicted in FIGS. 2A and 3B, and inhibits the inner electrode 2 from moving in the X1 direction. That is, the insulating member 6 inhibits the inner electrode 2 from moving in the X1 direction farther than the insulating member 6, for example.

Specifically, the insulating member 6 is disposed, for example, at a position on the side in the X2 direction relative to the pin member 5 and in contact with the pin member 5. The insulating member 6 has a shape that allows the insulating member 6 to come into contact with at least a part of the end portion 2b when the inner electrode 2 moves in the X1 direction, for example.

That is, the source gas A flows into the discharge space 9 from the side in the X2 direction toward the side in the X1 direction during operation of the ozone-generating apparatus 100 (while ozone is produced), for example. If, for example, the inner electrode 2 is not fixed to the dielectric 3 or any other member relative to the X axis as depicted in FIG. 1 and other figures, it is possible that the inner electrode 2 moves in the X1 direction in the discharge tube 10 in response to the inflow of the source gas A. In addition, when, for example, the ozone-generating apparatus 100 is transported by a vehicle or the like, it is also possible that the inner electrode 2 moves in the X1 direction in response to the vehicle or the like starting or stopping. Note that if the dielectric 3 is not fixed to the outer electrode 1 or any other member relative to the X axis, it is possible that the dielectric 3 moves in the X1 direction, as mentioned above.

The inhibiting member 90 in the present embodiment also includes, for example, the insulating member 6 that is in contact with the pin member 5 and faces the end portion 2b of the inner electrode 2.

The insulating member 6 makes it possible for the ozone-generating apparatus 100 in the present embodiment to inhibit the inner electrode 2 from moving (in the X1 direction) during operation and transportation of the ozone-generating apparatus 100, for example.

Specifically, the inner electrode 2 depicted in FIG. 1 is disposed on the inner circumferential side of the dielectric 3, for example. The insulating member 6 in the ozone-generating apparatus 100 in the present embodiment is disposed, for example, on the inner circumferential side of the dielectric 3 (i.e. at a position that is not sandwiched between the end portion 3b of the dielectric 3 and the pin member 5). This configuration makes it possible to dispose the insulating member 6 on the side in the X1 direction relative to the inner electrode 2, such that at least a part of the end portion 2b of the inner electrode 2 on the side in the X1 direction can be brought into contact with the insulating member 6 when the inner electrode 2 moves in the X1 direction. The insulating member 6 in the present embodiment can thus inhibit the inner electrode 2 from moving in the X1 direction farther than the insulating member 6, for example.

The insulating member 6 in the ozone-generating apparatus 100 in the present embodiment is, for example, disposed at a position between the inner electrode 2 and the pin member 5, thereby enabling prevention of electrical connection between the inner electrode 2 and the pin member 5 as well as prevention of electrical connection between the inner electrode 2 and the outer electrode 1.

Note that the insulating member 6 may alternatively have a shape such as a rectangular parallelepiped (i.e. a shape other than the cylindrical shape depicted in FIG. 3B), for example.

Next, the power supply ribbon 7 is described. The power supply ribbon 7 is, for example, disposed at a position facing the end portion 3a of the dielectric 3, and inhibits the dielectric 3 from moving in the X2 direction, as depicted in FIGS. 2A and 3A. That is, the power supply ribbon 7 inhibits the dielectric 3 from moving in the X2 direction farther than the power supply ribbon 7, for example.

Specifically, the power supply ribbon 7 is, for example, a conductive plate-shaped member, and has a shape that allows the power supply ribbon 7 to come into contact with at least a part of the end portion 3a when the dielectric 3 moves in the X2 direction.

The power supply ribbon 7 functions as a connecting member that electrically connects the plurality of power supply members 4 to each other in addition to the inhibiting member that inhibits the dielectric 3 from moving in the X2 direction, for example.

Specifically, the power supply ribbon 7 is, for example, spanned between a plurality of discharge tubes 10 (two discharge tubes 10 in the example depicted in FIG. 3A) adjacent to each other on the power supply members 4 of the discharge tubes 10, as depicted in FIG. 3A. That is, the power supply ribbon 7 simultaneously inhibits the dielectrics 3 of the plurality of discharge tubes 10 from moving in the X2 direction, for example.

A plurality of power supply ribbons 7 form a chain-like power supply member 70 (hereinafter also referred to as a chain member 70) by, for example, connecting adjacent power supply ribbons 7 to each other, as depicted in FIGS. 4A and 4B. That is, the chain member 70 includes at least two power supply ribbons 7 joined to each other.

The chain member 70 is, for example, connected to the AC power source 60 via at least one of the power supply ribbons 7 included in the chain member 70, and electrically connects each inner electrode 2 connected to the chain member 70 to the AC power source 60.

That is, the chain member 70 can apply a voltage from the AC power supply 60 to the inner electrodes 2 that are accommodated in the housing 40 and to be supplied with electric power, by connecting to a plurality of power supply members 4 that are accommodated in the housing 40 and to be supplied with electric power. In other words, in this case, the voltage from the AC power supply 60 is applied to each inner electrode 2 via the chain member 70 and the power supply member 4.

Specifically, the chain member 70 depicted in FIGS. 4A and 4B includes, for example, a power supply ribbon 7a, a power supply ribbon 7b, a power supply ribbon 7c, a power supply ribbon 7d, and a power supply ribbon 7e that are connected to each other. More specifically, the power supply ribbon 7a connects a power supply member 4a to a power supply member 4b due to the power supply member 4a and the power supply member 4b being inserted into a hole 7a1 and a hole 7a2, respectively, for example. The power supply ribbon 7b connects a power supply member 4b to a power supply member 4c due to the power supply member 4b and the power supply member 4c being inserted into a hole 7b1 and a hole 7b2, respectively, for example. The power supply ribbon 7c connects a power supply member 4c to a power supply member 4d due to the power supply member 4c and the power supply member 4d being inserted into a hole 7c1 and a hole 7c2, respectively, for example. The power supply ribbon 7d connects a power supply member 4d to a power supply member 4e due to the power supply member 4d and the power supply member 4e being inserted into a hole 7d1 and a hole 7d2, respectively, for example. The power supply ribbon 7e connects a power supply member 4e to a power supply member 4f due to the power supply member 4e and the power supply member 4f being inserted into a hole 7e1 and a hole 7e2, respectively, for example.

In the chain member 70 depicted in FIGS. 4A and 4B, for example, a side face of the power supply ribbon 7a on the side in the X1 direction and a side face of the power supply ribbon 7b on the side in the X2 direction are fixed to each other by fixing members (not depicted), such as a nut and a bolt. The side face of the power supply ribbon 7b on the side in the X2 direction and a side face of the power supply ribbon 7c on the side in the X1 direction are fixed to each other by the fixing members. The side face of the power supply ribbon 7c on the side in the X1 direction and a side face of the power supply ribbon 7d on the side in the X2 direction are fixed to each other by the fixing members. The side face of the power supply ribbon 7d on the side in the X2 direction and a side face of the power supply ribbon 7e on the side in the X1 direction are fixed to each other by the fixing members.

That is, it is possible that the inner electrode 2 and the dielectric 3 move in the X2 direction in response to a vehicle or the like starting or stopping during transportation of the ozone-generating apparatus 100, for example. It is also possible that the inner electrode 2 and the dielectric 3 move in the X2 direction during operation of the ozone-generating apparatus 100 (while ozone is produced), for example.

The ozone-generating apparatus 100 in the present embodiment includes, for example, a plurality of discharge tubes 10 each including the tubular outer electrode 1 extending along the first axis, the inner electrode 2 extending along the first axis, and the dielectric 3 extending in the first axis and disposed between the outer electrode 1 and the inner electrode 2. The ozone-generating apparatus 100 in the present embodiment also includes, for example, a power supply ribbon 7 that electrically connects the inner electrode 2 of one discharge tube 10 (hereinafter also referred to as a first discharge tube 10) to the inner electrode 2 of another discharge tube 10 adjacent to the first discharge tube 10 (hereinafter also referred to as a second discharge tube 10). The power supply ribbon 7 faces, for example, an end of the dielectric 3 of the first discharge tube 10 (e.g. the end portion 3a of the dielectric 3 of the first discharge tube 10) and an end of the dielectric 3 of the second discharge tube 10 (e.g. the end portion 3a of the dielectric 3 of the second discharge tube 10) (see FIGS. 3 and 4).

The ozone-generating apparatus 100 in the present embodiment also includes, for example, a plurality of power supply ribbons 7. One power supply ribbon 7 (hereinafter also referred to as a first power supply ribbon 7) electrically connects the inner electrode 2 of the first discharge tube 10 to the inner electrode 2 of the second discharge tube 10, for example. Another power supply ribbon 7 (hereinafter also referred to as a second power supply ribbon 7) electrically connects the inner electrode 2 of the first discharge tube 10 to the inner electrode 2 of yet another discharge tube 10 adjacent to the first discharge tube 10 (hereinafter also referred to as a third discharge tube 10).

The ozone-generating apparatus 100 in the present embodiment also includes, for example, the power supply members 4 extending along the first axis and electrically connected to the inner electrodes 2. Each power supply ribbon 7 is, for example, a conductive plate-shaped member having two holes (hereinafter also referred to as a first hole and a second hole). The power supply member 4 (e.g. the power supply member 4*b* depicted in FIG. 4B) of the first discharge tube 10 is inserted into the first hole (e.g. the hole 7*a*2 depicted in FIG. 4B) in the power supply ribbon 7 (e.g. the power supply ribbon 7*a* depicted in FIG. 4B) and in contact with the power supply ribbon 7. The power supply member 4 (e.g. the power supply member 4*a* depicted in FIG. 4B) of the second discharge tube 10 is inserted into the second hole (e.g. the hole 7*a*1 depicted in FIG. 4B) in the power supply ribbon 7 and in contact with the power supply ribbon 7.

The ozone-generating apparatus 100 in the present embodiment also includes, for example, the power supply members 4 extending along the first axis and electrically connected to the inner electrodes 2. Each power supply ribbon 7 is, for example, a conductive plate-shaped member having the first hole and the second hole. The power supply member 4 (e.g. the power supply member 4*b* depicted in FIG. 4B) of the first discharge tube 10 is inserted into the first hole (e.g. the hole 7*a*2 depicted in FIG. 4B) in the first power supply ribbon 7 (e.g. the power supply ribbon 7*a* depicted in FIG. 4B) and in contact with the first power supply ribbon 7. The power supply member 4 of the first discharge tube 10 is inserted into the first hole (e.g. the hole 7*b*1 depicted in FIG. 4B) in the second power supply ribbon 7 (e.g. the power supply ribbon 7*b* depicted in FIG. 4B) and in contact with the second power supply ribbon 7. The power supply member 4 (e.g. the power supply member 4*a* depicted in FIG. 4B) of the second discharge tube 10 is inserted into the second hole (e.g. the hole 7*a*1 depicted in FIG. 4B) in the first power supply ribbon 7 and in contact with the first power supply ribbon 7. The power supply member 4 (e.g. the power supply member 4*c* depicted in FIG. 4B) of the third discharge tube 10 is inserted into the second hole (e.g. the hole 7*b*2 depicted in FIG. 4B) in the second power supply ribbon 7 and in contact with the second power supply ribbon 7.

The ozone-generating apparatus 100 in the present embodiment has, for example, fixing members (not depicted) that fix each power supply ribbon 7 to the power supply members 4 inserted into the holes in the power supply ribbon 7.

The ozone-generating apparatus 100 in the present embodiment applies a voltage to the power supply ribbon 7, the applied voltage passes through the power supply members 4 electrically connected to the power supply ribbon 7, and is thus applied to the inner electrodes 2 electrically connected to the power supply members 4, for example.

In the ozone-generating apparatus 100 in the present embodiment, the first power supply ribbon 7 and the second power supply ribbon 7 are electrically connected to each other. A voltage is applied to the first power supply ribbon 7, and the applied voltage is thus applied to the second power supply ribbon 7 electrically connected to the first power supply ribbon 7.

These power supply ribbons 7 makes it possible for the ozone-generating apparatus 100 in the present embodiment to inhibit the inner electrode 2 and the dielectric 3 from moving (in the X2 direction) during transportation of the ozone-generating apparatus 100, for example.

Specifically, each power supply ribbon 7 depicted in FIG. 3A and other figures has a shape that allows two adjacent power supply members 4 to connect to the power supply ribbon 7. In the ozone-generating apparatus 100 in the present embodiment, disposing the power supply ribbon 7 on the side in the X2 direction relative to the dielectric 3 can bring at least a part of the end portion 3*a* of the dielectric 3 on the side in the X2 direction into contact with the power supply ribbon 7 when the dielectric 3 moves in the X2 direction, for example. The power supply ribbon 7 can thus inhibit the dielectric 3 from moving in the X2 direction farther than the power supply ribbon 7, for example.

The chain member 70 depicted in FIG. 4A and other figures connects the power supply members 4 that are accommodated in the housing 40 and to be supplied with electric power, for example. The chain member 70 in the ozone-generating apparatus 100 in the present embodiment can be fixed to the housing 40 by fixing a part of each power supply ribbon 7 constituting the chain member 70 to the housing 40, for example. This fixation can inhibit each power supply member 4 from moving in the X2 direction and inhibit the inner electrode 2 connected to the power supply member 4 from moving in the X2 direction.

In the ozone-generating apparatus 100 in the present embodiment, the AC power source 60 can be electrically connected to each inner electrode 2 by connecting the plurality of power supply ribbons 7 to each other to form the chain member 70, for example.

In the ozone-generating apparatus 100 in the present embodiment, the AC power source 60 can be electrically connected to a desired inner electrode 2 by connecting the plurality of power supply ribbons 7 to each other to form the chain member 70 in both the following first and second cases, for example.

The first and second cases are described with reference to FIG. 5. In the first case, the extending directions of the power supply members 4*a*, 4*b*, 4*c*, 4*d*, 4*e*, and 4*f* are not fixed (straight) but shift vertically and horizontally, as depicted in FIG. 5, for example. In the second case, even if the extending directions of the power supply members 4*a*, 4*b*, 4*c*, 4*d*, 4*e*, and 4*f* are fixed, the positions of these power supply members are not aligned at respective desired positions; in other words, the positions at which the power supply members are disposed vary in each discharge tube 10 (or each inner electrode 2), as depicted in FIG. 5.

In the first case, the chain member 70 formed by connecting the plurality of power supply ribbons 7 can absorb the shift in the extending directions of the power supply members 4 and connect the power supply members 4 while maintaining the extending directions of the respective power supply members 4 (i.e. without adjusting the extending directions of the power supply members 4). In the second case, the chain member 70 can also absorb the shift in the positions at which the respective power supply members 4 are disposed and connect the power supply members 4 while maintaining the positions at which the power supply members 4 are disposed (i.e. without adjusting the positions at which the power supply members 4 are disposed).

Thus, the use of the chain member 70 makes it possible, in both the first and second cases, to change the connection angle (joint angle) between two adjacent power supply ribbons 7 in accordance with the extending directions of the power supply members 4 or the positions at which the power supply members 4 are disposed. The power supply members 4 can thus be connected while maintaining the extending directions of the power supply members 4 and the positions at which the power supply members 4 are disposed.

That is, each of the first, second, and third discharge tubes 10 in the ozone-generating apparatus 100 in the present embodiment has, for example, the power supply member 4 that electrically connects the inner electrode 2 to the power supply ribbon 7. In the ozone-generating apparatus 100 in the present embodiment, the first, second, and third discharge tubes 10 are disposed along a predetermined linear direction (linear direction D in the example depicted in FIG. 5) in a cross-sectional plane (YZ plane) perpendicular to the first axis (X axis). A first linear direction (linear direction D1 in the example depicted in FIG. 5) of a line connecting a contact point (contact point P1 in the example depicted in FIG. 5) between the power supply member 4 (power supply member 4a in the example depicted in FIG. 5) of the first discharge tube 10 and the first power supply ribbon 7 (power supply ribbon 7a in the example depicted in FIG. 5) to a contact point (contact point P2 in the example depicted in FIG. 5) between the power supply member 4 (power supply member 4b in the example depicted in FIG. 5) of the second discharge tube 10 and the first power supply ribbon 7 (power supply ribbon 7a in the example depicted in FIG. 5), a second linear direction (linear direction D2 in the example depicted in FIG. 5) of a line connecting a contact point (contact point P2 in the example depicted in FIG. 5) between the power supply member 4 (power supply member 4b in the example depicted in FIG. 5) of the second discharge tube 10 to the second power supply ribbon 7 (power supply ribbon 7b in the example depicted in FIG. 5) to a contact point between the power supply member 4 (power supply member 4c in the example depicted in FIG. 5) of the third discharge tube 10 to the second power supply ribbon 7 (power supply ribbon 7b in the example depicted in FIG. 5), and the predetermined linear direction (linear direction D in the example depicted in FIG. 5) are different from each other. In other words, the predetermined linear direction D, the first linear direction D1, and the second linear direction D2 are not parallel with each other, as depicted in FIG. 5. Note that the power supply ribbons, the power supply members, and the contact points depicted in FIG. 5 are examples, and may be any other power supply ribbons, power supply members, and contact points.

Note that the power supply ribbon 7 may be attached to the power supply member 4 without a gap between the end portion 3a of the dielectric 3 and the power supply ribbon 7, and between the end portion 3b of the dielectric 3 and the pin member 5, for example. The power supply ribbon 7 may be attached to the power supply member 4 without a gap between the end portion 2b of the inner electrode 2 and the insulating member 6, for example.

This configuration makes it possible for the ozone-generating apparatus 100 in the present embodiment to more reliably inhibit the inner electrode 2 and the dielectric 3 from moving during operation and transportation of the ozone-generating apparatus 100, and prevent damage of the inner electrode 2 and the dielectric 3 caused by the movement thereof in the X-axis direction, for example.

Specific Example of Chain Member 70

Next, specific examples of the chain member 70 are described. FIGS. 6 to 9 are diagrams illustrating configuration examples of the chain member 70 in the first embodiment. Note that the examples in FIGS. 6 to 9 only depict the inner electrodes 2, the power supply members 4, and the power supply ribbons 7. Although the examples depicted in FIGS. 6 to 9 illustrate the case where every three adjacent inner electrodes 2 are arranged in an equilateral triangle, the inner electrodes 2 may be arranged in any other manner.

Figure 6:
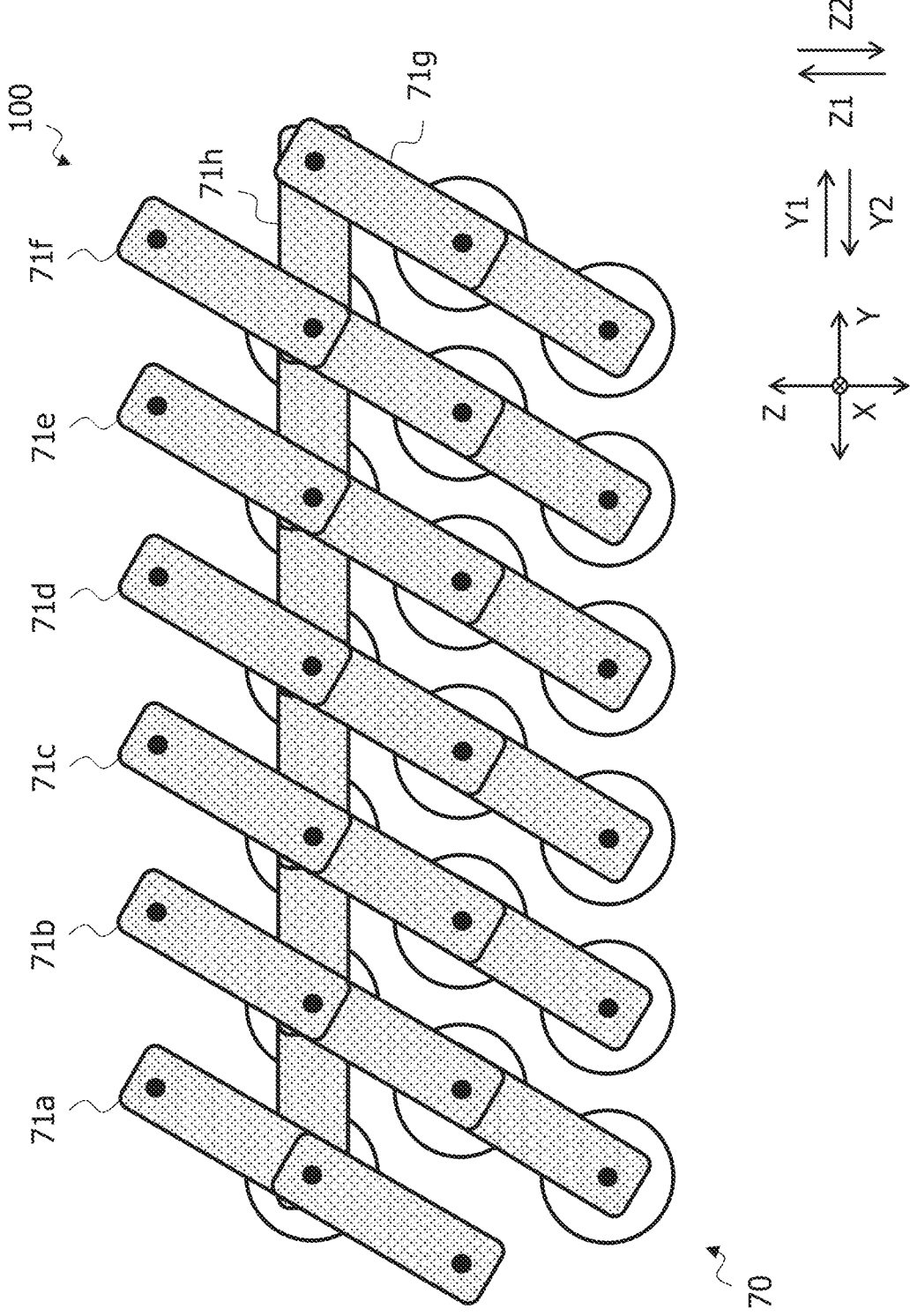
FIGS. 6 to 9 are diagrams illustrating configuration examples of the chain member 70 in the first embodiment.

The chain members 70 depicted in FIG. 6 include, for example, straight chain members 71a, 71b, 71c, 71d, 71e, 71f, and 71g, each of which connects a plurality of power supply members 4 arranged in a diagonal direction between the Y1 direction and the Z1 direction. The chain members 70 depicted in FIG. 6 also include, for example, a straight chain member 71h that connects the plurality of power supply members 4 arranged along the Y-axis direction to each other and also connects the chain members 71a, 71b, 71c, 71d, 71e, 71f, and 71g to each other.

Figure 7:
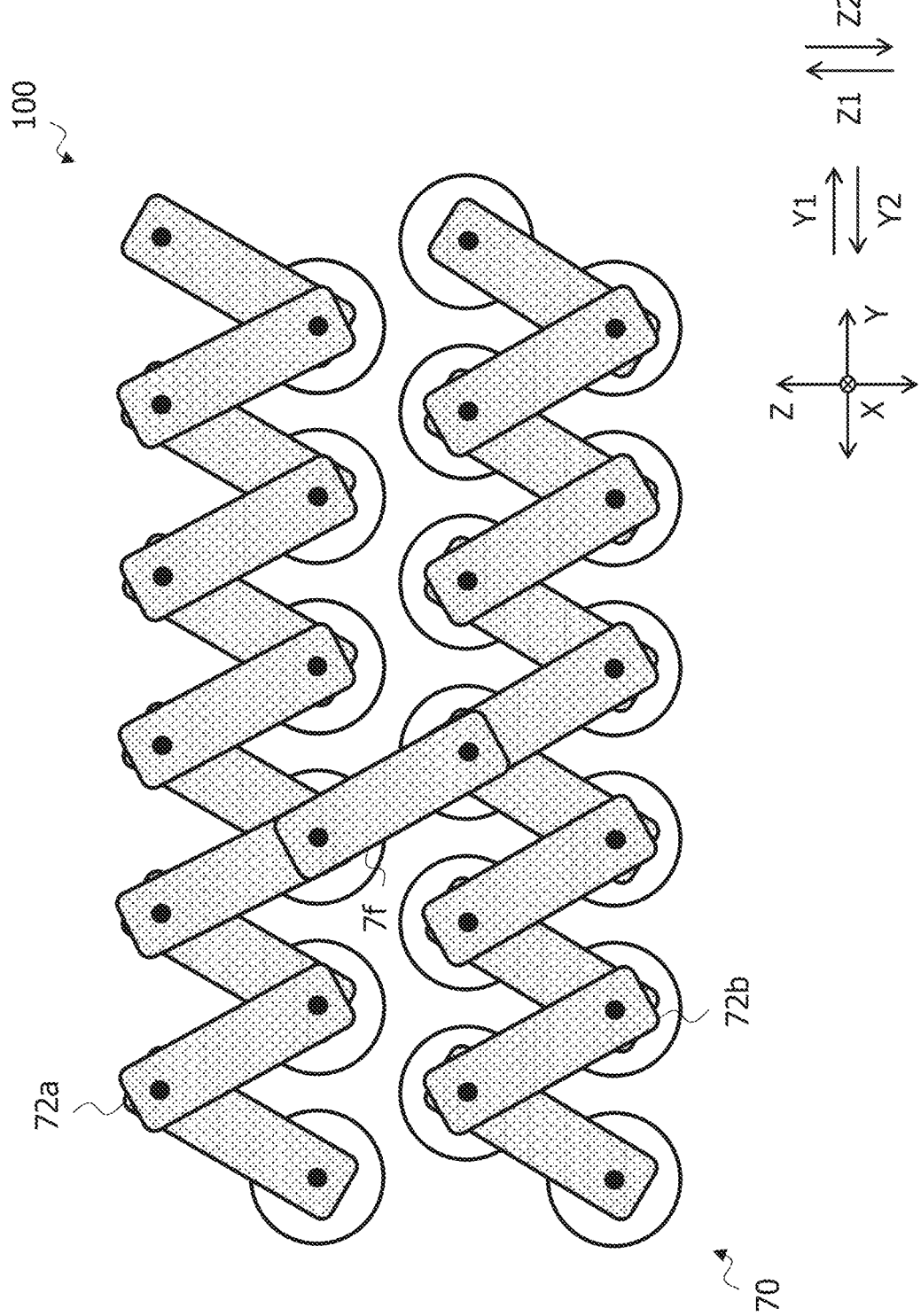

The chain members 70 depicted in FIG. 7 include, for example, chain members 72a and 72b that, each of which connects, in a zigzag shape, a plurality of power supply members 4 arranged along the Y-axis direction. The chain members 70 depicted in FIG. 7 also include, for example, a power supply ribbon 7f that connects two power supply members 4 arranged along a diagonal direction between the Y2 direction and the Z1 direction and connects the chain members 72a and 72b to each other.

Figure 8:
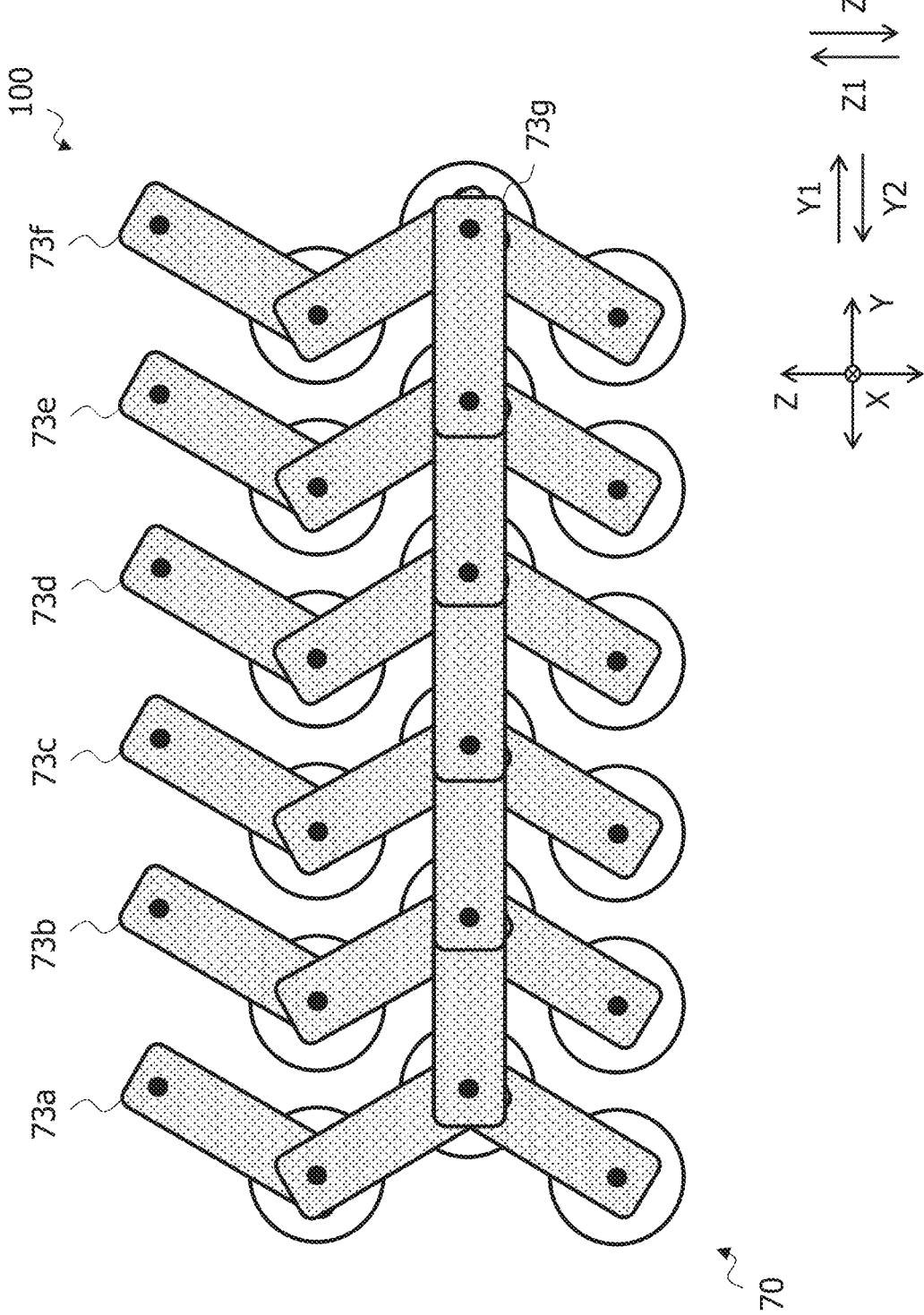

The chain members 70 depicted in FIG. 8 include, for example, chain members 73a, 73b, 73c, 73d, 73e, and 73f, each of which connects, in a zigzag shape, a plurality of power supply members 4 arranged along the Z-axis direction. The chain members 70 depicted in FIG. 8 also include, for example, a straight chain member 73g that connects a plurality of power supply members 4 arranged along the Y-axis direction and connects the chain members 73a, 73b, 73c, 73d, 73e, and 73f to each other.

Figure 9:
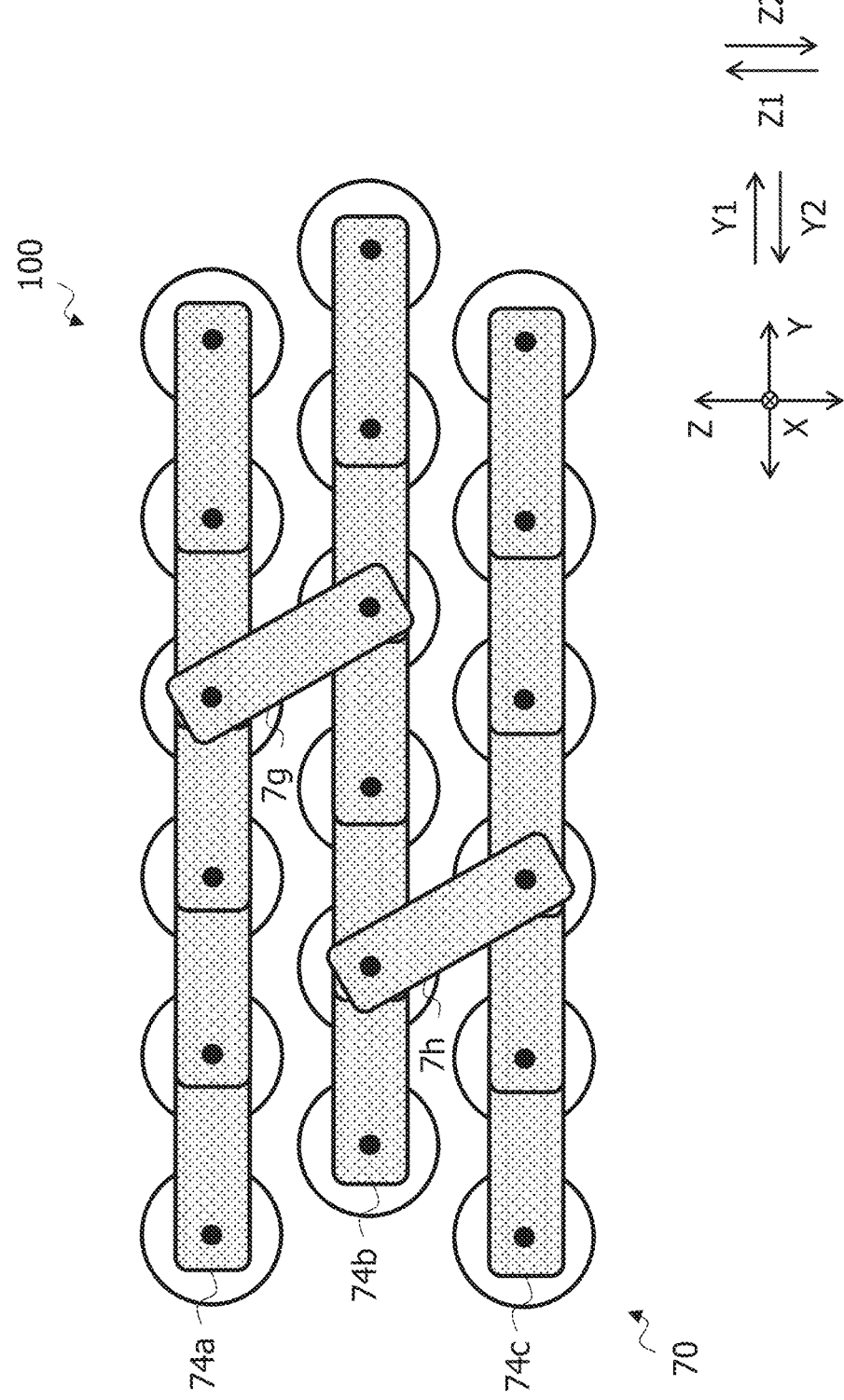

The chain members 70 depicted in FIG. 9 include, for example, straight chain members 74a, 74b, and 74c that connect a plurality of power supply members 4 arranged along the Y-axis direction. The chain members 70 depicted in FIG. 9 also include, for example, a power supply ribbon 7g that connects two power supply members 4 arranged along a diagonal direction between the Y2 direction and the Z1 direction and connects the chain members 74a and 74b to each other. The chain members 70 depicted in FIG. 9 also include, for example, a power supply ribbon 7h that connects two power supply members 4 arranged along a diagonal direction between the Y2 direction and the Z1 direction and connects the chain members 74b and 74c to each other.

That is, the chain member 70 may include, for example, one or more power supply ribbons 7 disposed along a first direction, and one or more power supply ribbons 7 disposed in a second direction different from the first direction and connected to any one of the one or more power supply ribbons 7 disposed in the first direction, as depicted in FIGS. 6 to 9.

First Variation of Ozone-Generating Apparatus 100

Figure 10:
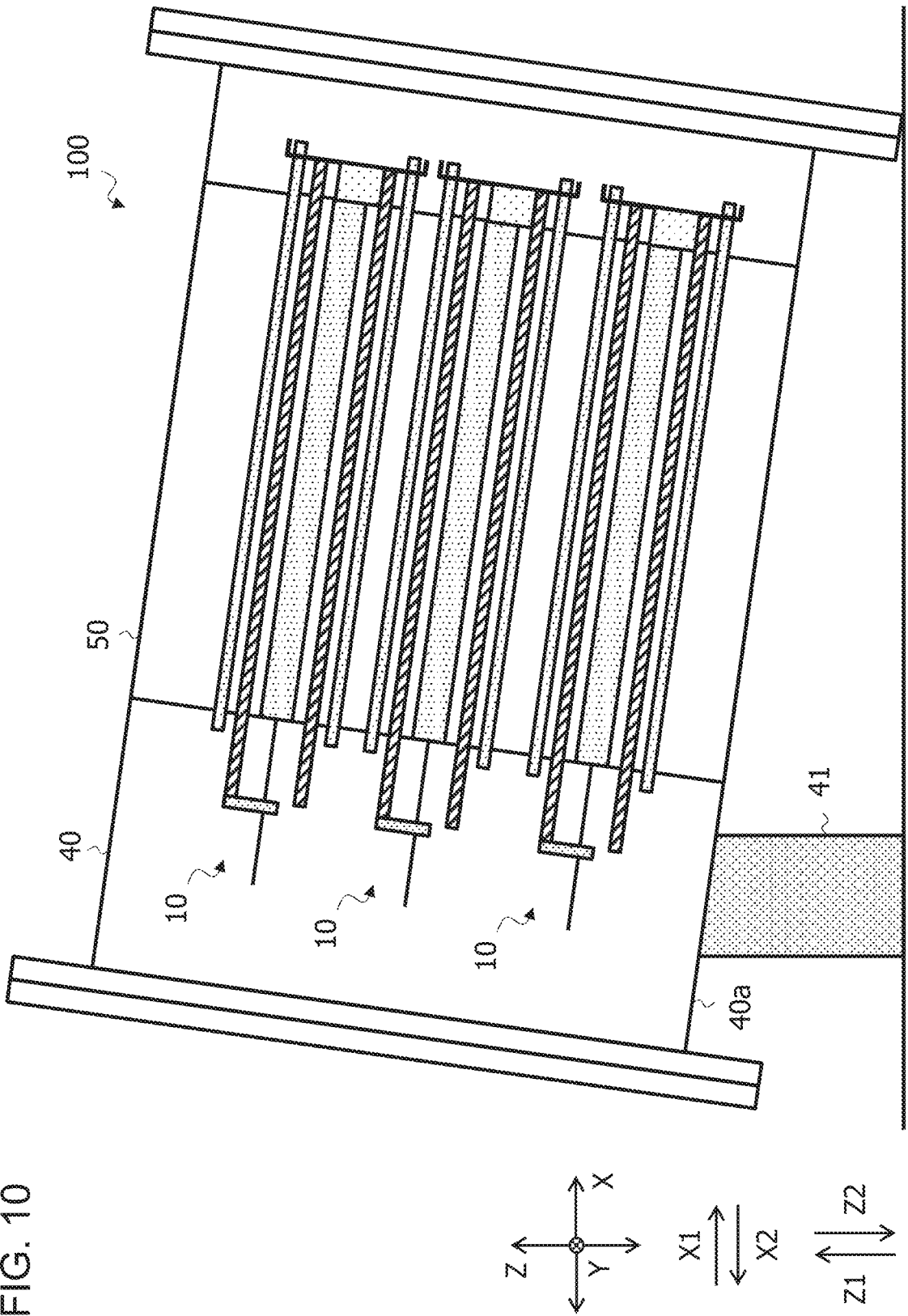
FIG. 10 is a side cross-sectional view of the first variation of the ozone-generating apparatus 100 in the first embodiment.

Next, a first variation of the ozone-generating apparatus 100 is described. FIG. 10 is a side cross-sectional view of the first variation of the ozone-generating apparatus 100 in the first embodiment. Note that the example in FIG. 10 omits the AC power source 60 and the power supply line 61.

The ozone-generating apparatus 100 may be, for example, disposed in an inclined state relative to the X-axis direction (horizontal direction) during operation and transportation of the ozone-generating apparatus 100.

Specifically, the ozone-generating apparatus 100 in this variation may have, outside the apparatus 100, an installation member 41 for installing the ozone-generating apparatus 100 such that the height of the end portion 3b of the dielectric 3 in the Z-axis direction (vertical direction) is lower than the height of the end portion 3a of the dielectric 3 in the Z-axis direction, as depicted in FIG. 10, for example.

That is, the ozone-generating apparatus 100 in this variation may be disposed such that the height of the discharge tube 10 in the Z-axis direction is lower on the side in the X1 direction than on the side in the X2 direction, using the installation member 41.

More specifically, the installation member 41 may be, for example, a metal member that is attached to the side, in the X2 direction, of an outer wall 40a of the housing 40. The ozone-generating apparatus 100 may be, for example, disposed such that the installation member 41 is located in the Z2 direction (vertically downward) relative to the ozone-generating apparatus 100 during operation and transportation of the ozone-generating apparatus 100.

This configuration makes it possible for the ozone-generating apparatus 100 in this variation to more reliably inhibit the inner electrode 2 and the dielectric 3 from moving (in the X2 direction) during operation and transportation of the ozone-generating apparatus 100, for example.

Note that the ozone-generating apparatus 100 may be installed, for example, such that the extending direction of the discharge tube 10 is parallel with the Z-axis. That is, the ozone-generating apparatus 100 may be, for example, installed such that the source gas A enters the discharge tube 10 from the side in the Z1 direction and the ozone gas B exits from the side, in the Z2 direction, of the discharge tube 10.

Second Variation of Ozone-Generating Apparatus 100

Figure 11:
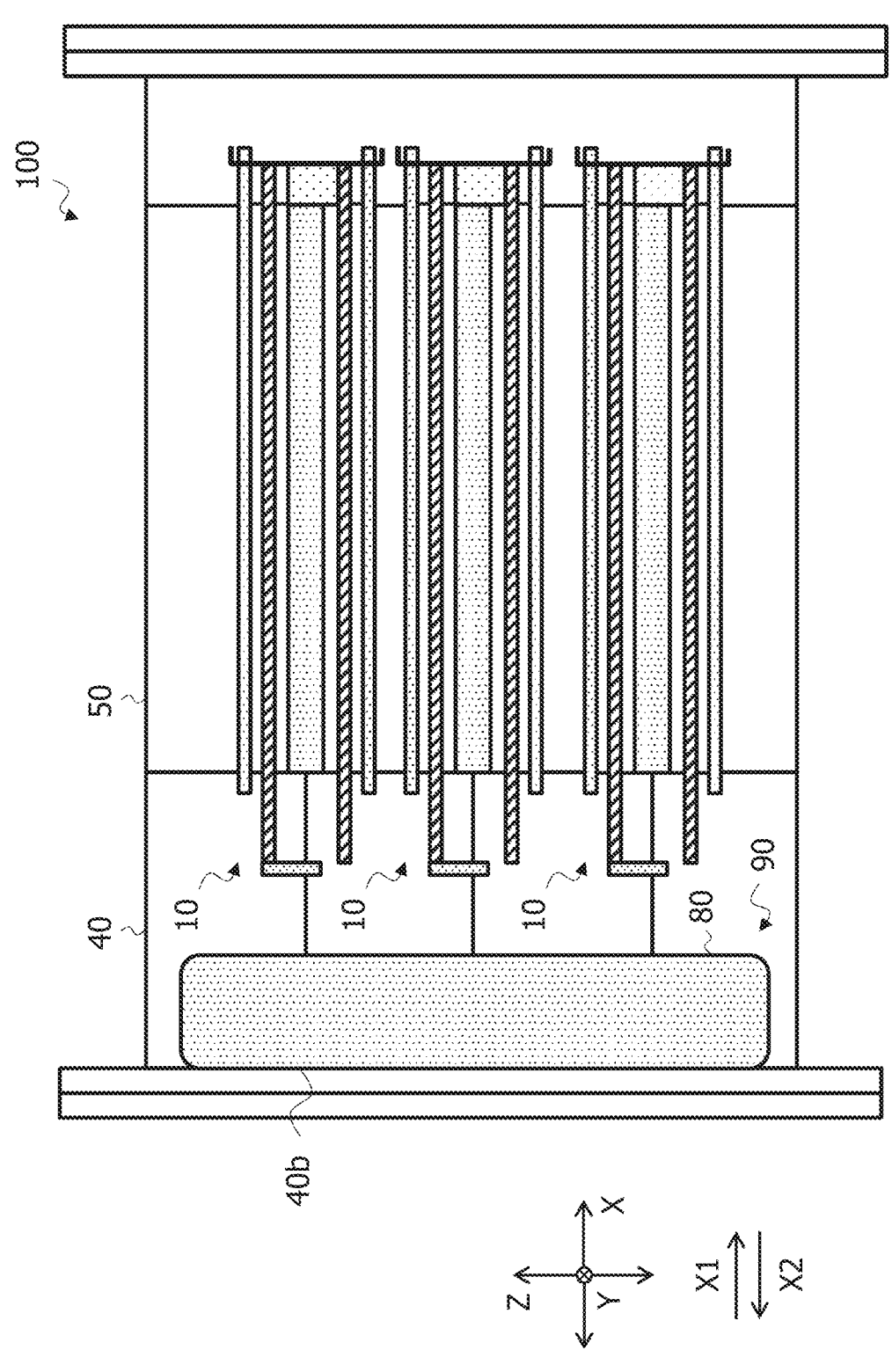
FIG. 11 is a side cross-sectional view of the second variation of the ozone-generating apparatus 100 in the first embodiment.

Next, a second variation of the ozone-generating apparatus 100 is described. FIG. 11 is a side cross-sectional view of the second variation of the ozone-generating apparatus 100 in the first embodiment. Note that the example in FIG. 11 omits the AC power source 60 and the power supply line 61.

The ozone-generating apparatus 100 may have, for example, a configuration in which a fixation member 80 is disposed between an inner wall 40b of the housing 40 on the side in the X2 direction and the power supply members 4 of the discharge tubes 10 during transportation of the ozone-generating apparatus 100, as depicted in FIG. 11. The fixation member 80 is, for example, a cushioning material made of paper, resin, or the like.

Specifically, each discharge tube 10 in this variation may include, for example, a power supply member 4 extending along the first axis and electrically connected to the inner electrode 2. An end (e.g. an end on the side in the X2 direction) of the power supply member 4 may be located on the outer side of the discharge tube 10. The inhibiting member 90 may also include the fixation member 80 that is in contact with an end of the power supply member 4 on the outer side of the discharge tube 10 and inhibits the inner electrode 2 from moving toward the end side of the power supply member 4.

This configuration makes it possible for the ozone-generating apparatus 100 in this variation to more reliably inhibit the inner electrode 2 and the dielectric 3 from moving (in the X2 direction) during transportation of the ozone-generating apparatus 100, for example.

Third Variation of Ozone-Generating Apparatus 100

Figure 12:
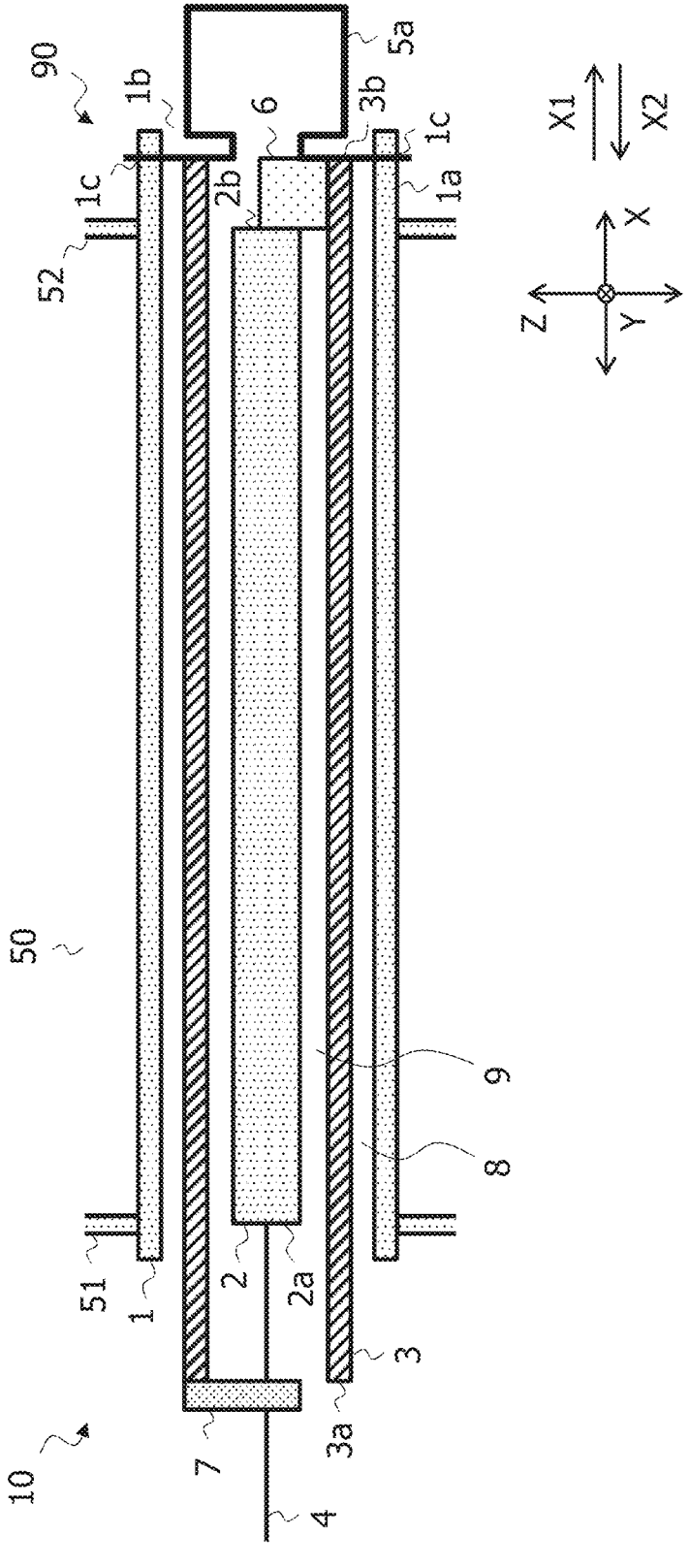
FIGS. 12 and 13 are a side cross-sectional view of the third variation of the ozone-generating apparatus 100 in the first embodiment.
Figure 13:
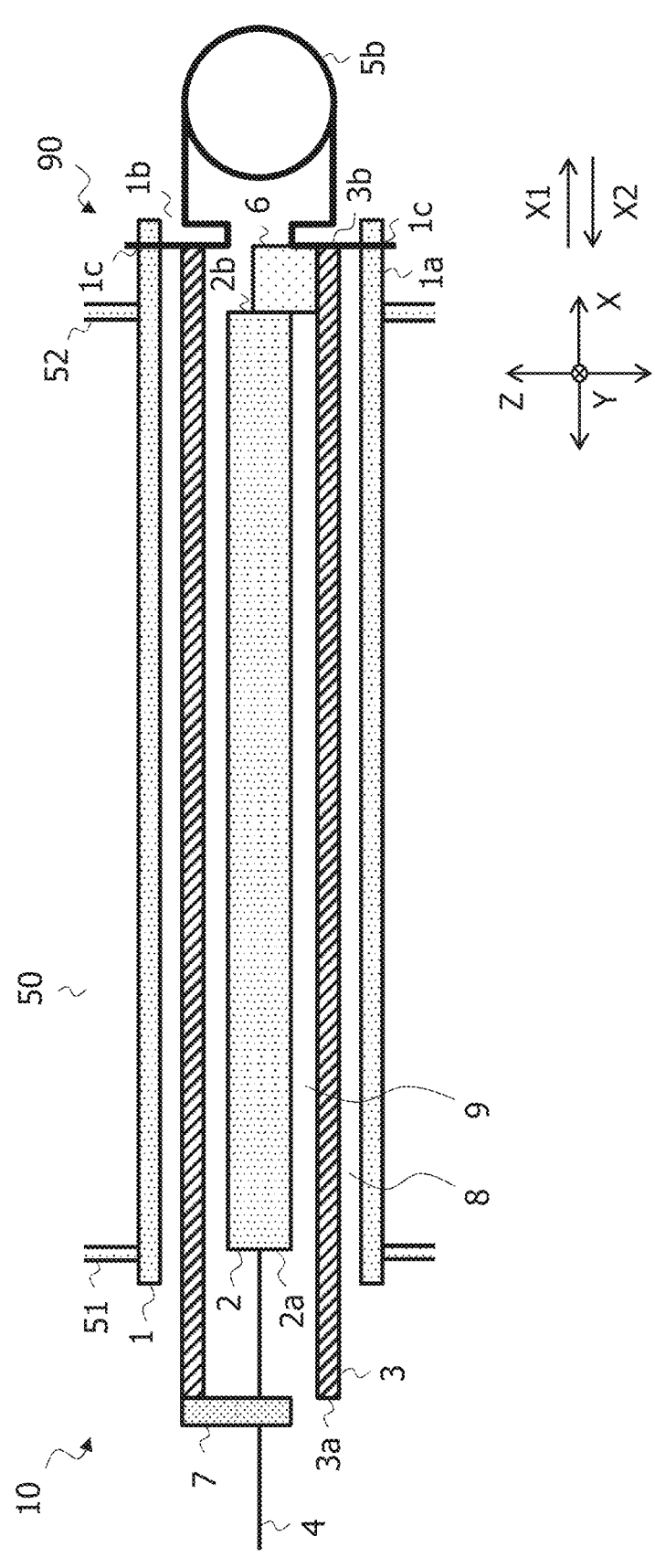

Next, a third variation of the ozone-generating apparatus 100 is described. FIGS. 12 and 13 are side cross-sectional views of the third variation of the discharge tube 10 in the first embodiment.

The discharge tube 10 may have, for example, a clip-shaped member 5 (hereinafter also referred to as a clip member 5a) as depicted in FIG. 12, instead of the pin member 5 illustrated in FIG. 2 and other figures.

The clip member 5a is made of metal such as stainless steel. The clip member 5a has a portion that comes into contact with the outer electrode 1 at the end portion 1a (opening portion 1b) of the outer electrode 1 on the side in the X1 direction due to extending in the radial direction of the outer electrode 1 as depicted in FIG. 12, and inhibits the dielectric 3 from moving in the X1 direction, for example. That is, the clip member 5a inhibits the dielectric 3 from moving in the X1 direction farther than the clip member 5a, similarly to the pin member 5 illustrated in FIG. 2 and other figures. The clip member 5a has, for example, a substantially rectangular shape due to a part of the clip member 5a on the side in the X1 direction being bent more than once toward the X-axis direction and the Z-axis direction.

That is, the outer electrode 1 in this variation is, for example, an electrode tube having both ends open. The inner electrode 2 has the end portion 2a and the end portion 2b. The dielectric 3 has a tubular shape and has the end portion 3a and the end portion 3b. The inhibiting member 90 includes the clip member 5a having a portion extending in the radial direction of the outer electrode 1. The clip member 5a is in contact with the outer electrode 1 and faces the end portion 3b of the dielectric 3.

Although a part of the clip member 5a depicted in FIG. 12 on the side in the X1 direction has a substantially rectangular shape, the shape is not limited thereto. Specifically, the discharge tube 10 may alternatively have, for example, a clip-shaped member 5 (hereinafter also referred to as a clip member 5b) having a substantially circular portion on the side in the X1 direction as depicted in FIG. 13, instead of the pin member 5 illustrated in FIG. 2 and other figures. The discharge tube 10 may have, for example, a member 5 having a portion with a shape other than a substantially rectangular or circular shape (e.g. with a substantially elliptical or polygonal shape) on the side in the X1 direction.

As illustrated in FIGS. 2, 11, 12, and other figures, the member 5, including the pin member 5, the clip member 5a, and the clip member 5b, has a first section that faces the end portion 3b of the dielectric 3 and extends in the radial direction of the outer electrode 1, and a second section that extends in a direction different from the radial direction of the outer electrode 1 outside the outer electrode 1. Portions of the first section are inserted into two holes 1c in the outer electrode 1, for example.

Fourth Variation of Ozone-Generating Apparatus 100

Figures 14A, 14B:
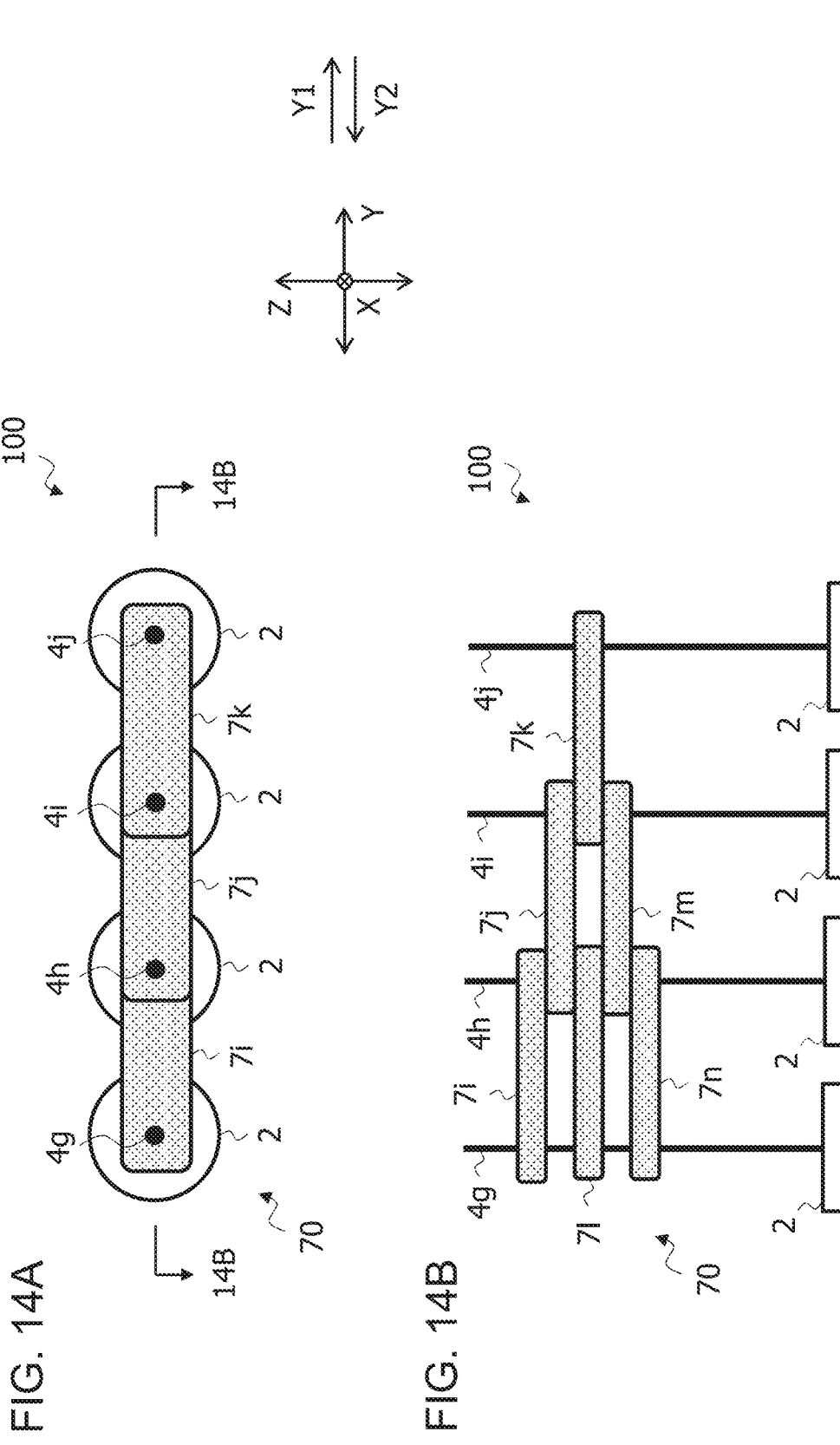
FIGS. 14A and 14B illustrate a configuration example of the chain member 70 in the first embodiment.

Next, a fourth variation of the ozone-generating apparatus 100 is described. FIG. 14 illustrates a configuration example of the chain member 70 in the first embodiment. Specifically, FIG. 14A is a front view of four discharge tubes 10 arranged in the Y-axis direction, and FIG. 14B is a 14B-14B cross-sectional view of the four discharge tubes 10 arranged in the Y-axis direction. Note that the example in FIG. 14 only depicts the inner electrodes 2, the power supply members 4, and the power supply ribbons 7. The chain member 70 in the following description is connected to the AC power source 60 via the power supply ribbons 7 located on the side in the Y2 direction, and electrically connects, to the AC power source 60, each inner electrode 2 connected to the chain member 70.

In the above-described example illustrated in FIG. 4 and other figures, one power supply ribbon 7 is provided and spanned between two power supply members 4 of two adjacent discharge tubes 10, but the present invention is not limited thereto. Each of the power supply members 4 of two adjacent discharge tubes 10 may be provided with a plurality of power supply ribbons 7, for example.

The number of power supply ribbons 7 (hereinafter also referred to as first power supply ribbons 7 or first connecting members 7) each of which is spanned between two power supply members 4 located closer to the AC power source 60 may be larger than the number of power supply ribbons 7 (hereinafter also referred to as second power supply ribbons 7 or second connecting members 7) each of which is spanned between two power supply members 4 located farther from the AC power source 60. That is, the number of first power supply ribbons 7 may be larger than the number of second power supply ribbons 7 connected to the AC power source 60 via the first power supply ribbons 7, for example. In other words, the ozone-generating apparatus 100 may include, for example, N (N is an integer of one or more) second power supply ribbons 7 and (N+1) or more first power supply ribbons 7.

Specifically, the chain member 70 depicted in FIGS. 14A and 14B includes, for example, power supply ribbons 7i, 7j, 7k, 7l, 7m, and 7n that are connected to each other. More specifically, the power supply ribbons 7i, 7l, and 7n each connect the power supply member 4g to the power supply member 4h in the example depicted in FIGS. 14A and 14B. The power supply ribbons 7j and 7m each connect the power supply member 4h to the power supply member 4i. The power supply ribbon 7k connects the power supply member 4i to the power supply member 4j.

That is, in the chain member 70 in the example depicted in FIG. 14B, the number (three) of power supply ribbons 7 spanned between the power supply members 4g and 4h is larger than the number (two) of power supply ribbons 7 spanned between the power supply members 4h and 4i, for example. Further, in the chain member 70 in the example depicted in FIG. 14B, the number (two) of power supply ribbons 7 spanned between the power supply members 4h and 4i is larger than the number (one) of power supply ribbons 7 spanned between the power supply members 4i and 4j, for example.

As described above, the power supply ribbons 7 are provided such that the surface area of the chain member 70 is smaller at a location farther from the AC power source 60, i.e. the surface area of the chain member 70 is larger at a location closer to the AC power source 60. For example, a single power supply ribbon 7j, which is spanned between a second power supply member 4h and a power supply member 4i, is disposed between a power supply ribbon 7i and a power supply ribbon 7l that are spanned between a first power supply member 4g and the second power supply member 4h that are adjacent to each other. That is, an end portion (on the side in the Y2 direction) of the power supply ribbon 7j is sandwiched between an end portion (on the side in the Y1 direction) of the power supply ribbon 7i and an end portion (on the side in the Y1 direction) of the power supply ribbon 7l.

This configuration allows the chain member 70 in this variation to have a surface area of the power supply ribbons 7 located at positions closer to the AC power source 60 (i.e. positions where the current density is higher) that is larger than the surface area of the power supply ribbons 7 located at positions farther from the AC power source 60 (i.e. positions where the current density is lower), for example. The chain member 70 can thus prevent the resistance near the surface from increasing due to the skin effect in the power supply ribbons 7 located at positions closer to the AC power source 60, for example. The chain member 70 can accordingly lower the magnitude of current flowing through the power supply ribbons 7 located at positions closer to the AC power source 60 and reduce heat generated from the power supply ribbons 7 located at positions closer to the AC power source 60, for example.

Note that the chain member 70 in this variation may be joined to the chain member 70 in the first embodiment (the chain member 70 illustrated in FIG. 4 and other figures) to form one chain member 70 (hereinafter also referred to as a joined chain member 70), for example. Specifically, the joined chain member 70 may include, for example, a section corresponding to the chain member 70 in this variation used for a plurality of discharge tubes 10 located at positions closer to the AC power source 60, and a section corresponding to the chain member 70 in the first embodiment used for the plurality of discharge tubes 10 located at positions farther from the AC power source 60.

In the description of the above example, the surface area of the power supply ribbons 7 between two adjacent discharge tubes 10 is increased by increasing the number of power supply ribbons 7 spanned between two power supply members 4 of the two adjacent discharge tubes 10. However, the present invention is not limited thereto. Specifically, the chain member 70 in this variation may have, for example, a surface area of the power supply ribbons 7 between two adjacent discharge tubes 10 that is increased by increasing the width (length in the Z-axis direction) of the power supply ribbons 7 spanned between two power supply members 4 of the two adjacent discharge tubes 10.

Ozone-Generating Apparatus 200 in Second Embodiment

Figures 15A, 15B:
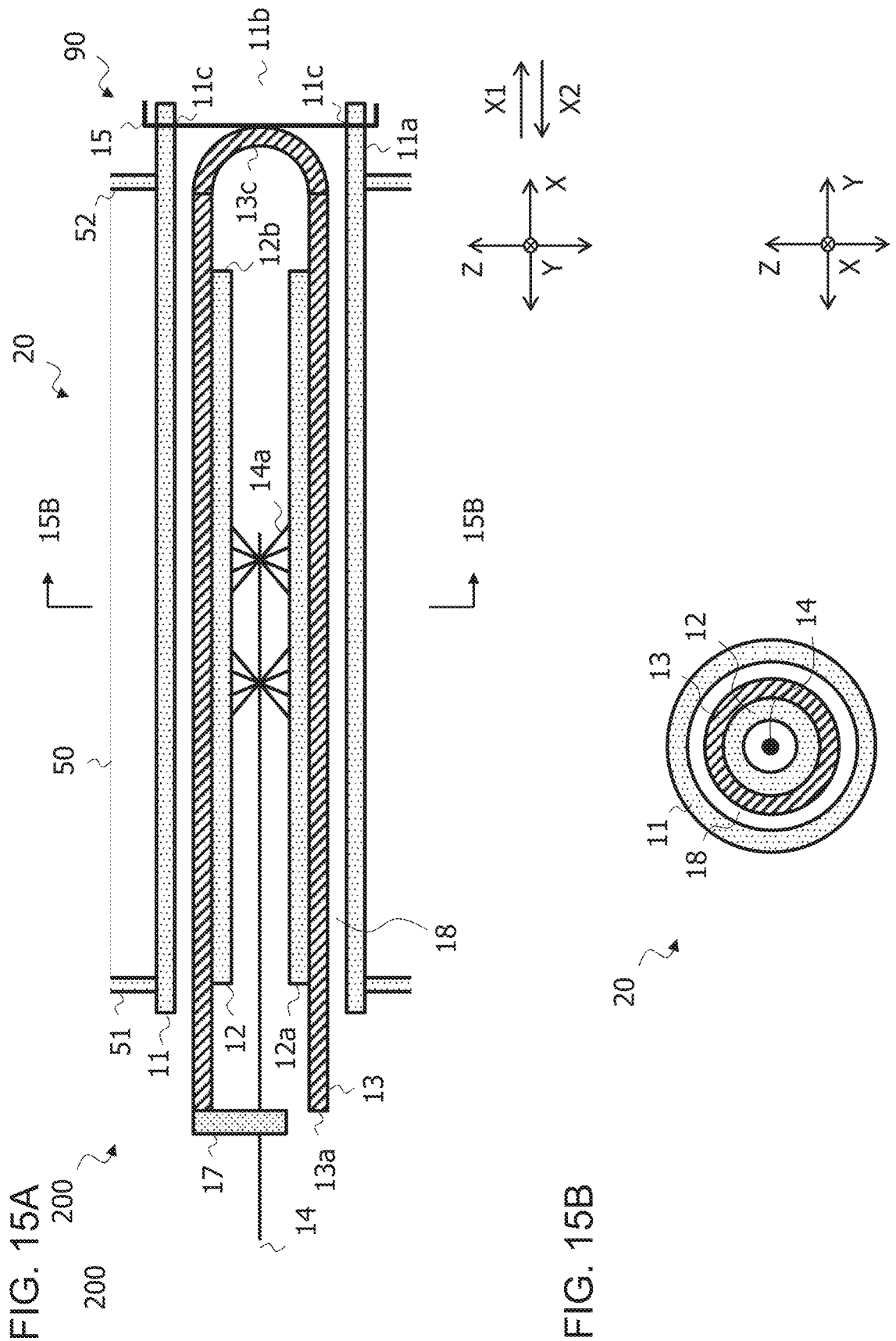
FIGS. 15A and 15B are diagrams illustrating a configuration example of a discharge tube 20 in the second embodiment.

Next, an ozone-generating apparatus 200 in the second embodiment is described. FIG. 15 is a diagram illustrating a configuration example of a discharge tube 20 in the second embodiment. Specifically, FIG. 15A is a side cross-sectional view of the discharge tube 20, and FIG. 15B is a 15B-15B cross-sectional view of the discharge tube 20.

Unlike the ozone-generating apparatus 100 in the first embodiment, the ozone-generating apparatus 200 has a plurality of discharge tubes 20 instead of the plurality of discharge tubes 10, as depicted in FIG. 15. Note that similar to the ozone-generating apparatus 100 in the first embodiment, the ozone-generating apparatus 200 may include the housing 40, the cooling unit 50, and the AC power source 60, for example.

As in the case illustrated in FIG. 1 and other figures, each of the discharge tubes 20 produces the ozone gas B by means of barrier discharge in response to the inflow of the source gas A in the X2 direction, and releases the produced ozone gas B in the X1 direction.

Specifically, each of the discharge tubes 20 includes, for example, an outer electrode 11, an inner electrode 12, a dielectric 13, a power supply member 14, a pin member 15 (hereinafter also referred to as a member 15), and a power supply ribbon 17 (hereinafter also referred to as a connecting member 17), as depicted in FIGS. 15A and 15B.

The outer electrode 11 has a cylindrical shape extends from the side in the X2 direction toward the side in the X1 direction and has both ends open, as in the case illustrated in FIG. 2 and other figures, for example. Hereinafter, an end portion of the outer electrode 11 on the side in the X1 direction is also referred to as an end portion 11a.

The dielectric 13 is, for example, a glass tube having a cylindrical shape coaxial with the outer electrode 11. The dielectric 13 extends, for example, from the side in the X2 direction toward the side in the X1 direction, has an open end portion 13a on the side in the X2 direction and a closed end portion 13c on the side in the X1 direction that forms a hemispherical shape. The dielectric 13 is disposed at a position spaced apart from the inner circumferential face of the outer electrode 11, for example. Hereinafter, an end portion of the dielectric 13 on the side in the X2 direction is also referred to as an end portion 13*a* or a first end 13*a,* and an end portion of the dielectric 13 on the side in the X1 direction is also referred to as an end portion 13*c* or a second end 13*c.*

Specifically, the dielectric 13 is disposed such that, for example, a gap functioning as a discharge space 18 is formed between the dielectric 13 and the inner circumferential face of the outer electrode 11.

The inner electrode 12 is disposed so as to be adhered to the inner circumferential face of the dielectric 13, for example. The inner electrode 12 has a cylindrical shape that extends from the side in the X2 direction side toward the side in the X1 direction, is coaxial with the outer electrode 11, and has both ends open, for example. That is, the inner electrode 12 in the present embodiment is integral to the dielectric 13, for example. Hereinafter, an end portion of the inner electrode 12 on the side in the X2 direction is also referred to as an end portion 12*a* or a first end 12*a,* and an end portion of the inner electrode 12 on the side in the X1 direction is also referred to as an end portion 12*b* or a second end 12*b.*

The power supply member 14 is, for example, a bar-shaped power supply rod, extends from the side in the X2 direction (the power supply line 61) to a space between the end portion 12*a* and the end portion 12*b* of the inner electrode 12 in the X-axis direction (e.g. to a position near the center of the inner electrode 12 in the X-axis direction), and applies a voltage from the AC power source 60 to the inner electrode 12. Specifically, the power supply member 14 applies a voltage from the AC power source 60 to the inner electrode 12 via a brush member 14*a,* for example.

That is, the inner side of the dielectric 13 in each discharge tube 20 in the present embodiment is, for example, in contact with the outer side of the inner electrode 12, and the outer side of the dielectric 13 faces the inner side of the outer electrode 11 with a predetermined distance therebetween.

The pin member 15 is made of metal such as stainless steel. The pin member 15 is, for example, in contact with the outer electrode 11 at the end portion 11*a* (opening portion 11*b*) of the outer electrode 11 on the side in the X1 direction due to extending in the radial direction of the outer electrode 11, and inhibits the dielectric 13 from moving in the X1 direction. That is, the pin member 15 inhibits the inner electrode 12 and the dielectric 13 from moving in the X1 direction farther than the pin member 15, for example, as in the case illustrated in FIG. 2 and other figures.

Specifically, the outer electrode 11 has, for example, two holes 11*c* along the radial direction at the end portion 11*a* (a wall forming the end portion 11*a*). Two ends of the pin member 15 are each inserted into a corresponding one of the two holes 11*c,* for example. The two ends of the pin member 15 are located outward of the outer electrode 11, and are bent in a direction (e.g. the X1 direction) different from the extending direction (radial direction) of the pin member 15, for example.

The power supply ribbon 17 is, for example, disposed at a position facing the end portion 13*a* of the dielectric 13, and inhibits the dielectric 13 from moving in the X2 direction. That is, the power supply ribbon 17 inhibits the inner electrode 12 and the dielectric 13 from moving in the X2 direction farther than the power supply ribbon 17, for example, as in the case illustrated in FIG. 4 and other figures.

Specifically, the power supply ribbon 17 is, for example, a conductive plate-shaped member, and has a shape that allows the power supply ribbon 17 to come into contact with at least a part of the end portion 13*a* when the dielectric 13 moves in the X2 direction.

That is, the inner electrode 12 is integral to the dielectric 13 in the discharge tube 20 in the present embodiment. The pin member 15 in the discharge tube 20 can thus inhibit both the inner electrode 12 and the dielectric 13 from moving in the X1 direction. Further, the power supply ribbon 17 in the discharge tube 20 can also inhibit both the inner electrode 12 and the dielectric 13 from moving in the X2 direction.

This configuration makes it possible for the ozone-generating apparatus 200 in the present embodiment to inhibit the inner electrode 12 and the dielectric 13 from moving (in the X1 direction or the X2 direction) during operation and transportation of the ozone-generating apparatus 200, for example, as in the case of the ozone-generating apparatus 100.

The AC power source 60 in the ozone-generating apparatus 200 in the present embodiment can be electrically connected to each inner electrode 12 by connecting the plurality of power supply ribbons 17 to form the chain member 70, for example.

The power supply members 14 in the ozone-generating apparatus 200 in the present embodiment can be connected while maintaining the extending direction of each power supply member 14 by connecting a plurality of power supply ribbons 17 to form the chain member 70 as illustrated in FIG. 5, even in the first and second cases illustrated in FIG. 5, for example. This configuration can electrically connect the AC power source 60 to the inner electrodes 12 in the ozone-generating apparatus 200.

Note that the ozone-generating apparatus 200 in the present embodiment may also include the installation member 41 as in the case illustrated in FIG. 10, for example. The ozone-generating apparatus 200 in the present embodiment may also include the fixation member 80 as in the case illustrated in FIG. 11, for example. The ozone-generating apparatus 200 in the present embodiment may include the clip member 5*a* or 5*b* instead of the pin member 15 as in the case illustrated in FIG. 12 or 13, for example. The ozone-generating apparatus 200 in the present embodiment may also have, for example, the chain member 70 illustrated in FIG. 14.

First Variation of Ozone-Generating Apparatus 200

Figures 16A, 16B:
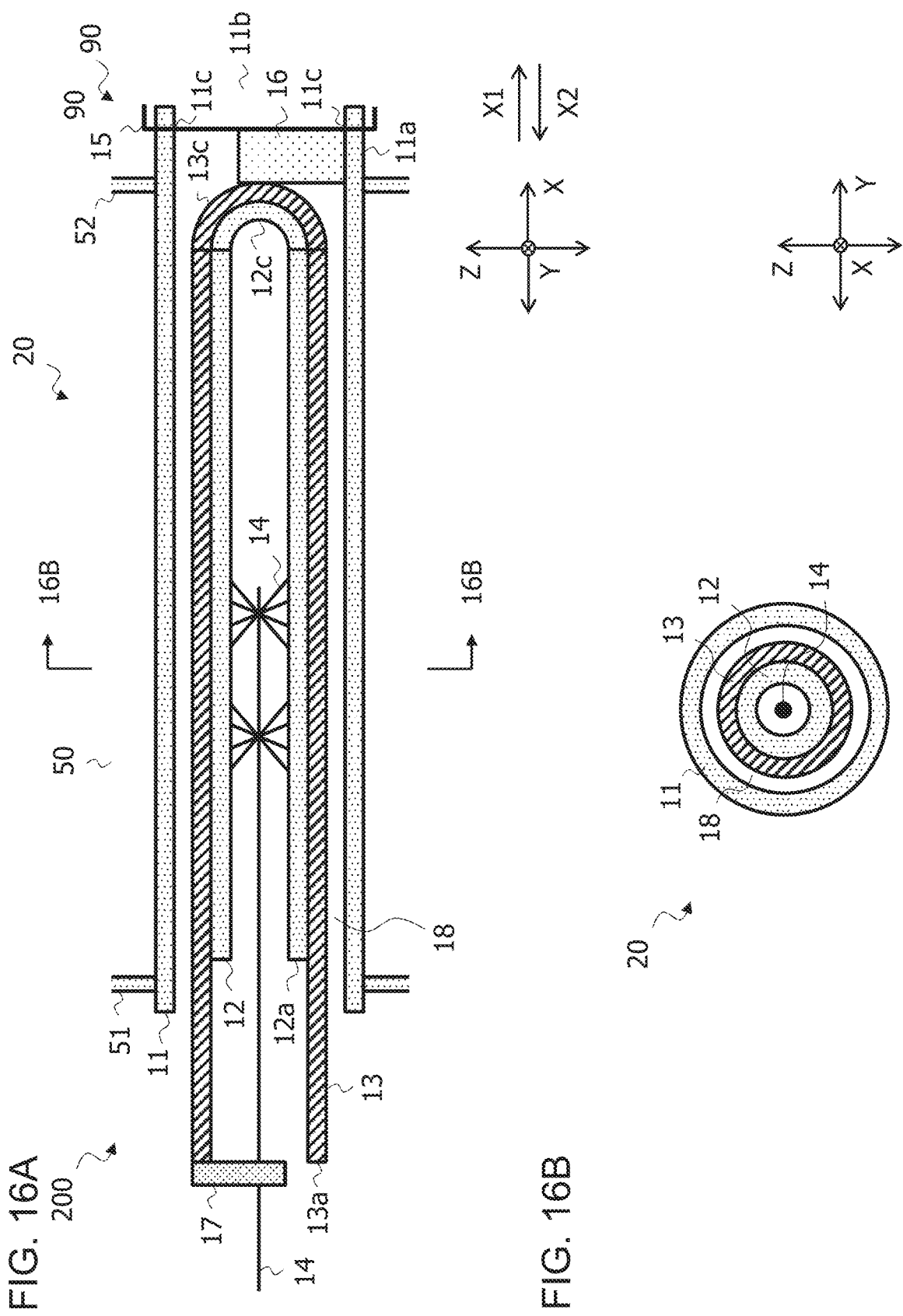
FIGS. 16A and 16B are diagrams illustrating the first variation of the configuration example of the discharge tube 20 in the second embodiment.

Next, a first variation of the ozone-generating apparatus 200 is described. FIG. 16 is a diagram illustrating the first variation of the configuration example of the discharge tube 20 in the second embodiment. Specifically, FIG. 16A is a side cross-sectional view of the discharge tube 20, and FIG. 16B is a 16B-16B cross-sectional view of the discharge tube 20.

The inner electrode 12 may extend, for example, from the side in the X2 direction toward the side in the X1 direction, and have an open end portion 12*a* on the side in the X2 direction and a closed end portion 12*c* on the side in the X1 direction that forms a hemispherical shape, as depicted in FIG. 16A. The inner electrode 12 may be disposed such that the inner electrode 12, including the end portion 12*c,* is adhered to the inner circumferential face of the dielectric 13, for example.

The discharge tube 20 in this case may have an insulating member 16 at the end portion 11*a* of the outer electrode 11 on the side in the X1 direction, for example.

The insulating member 16 is, for example, an insulator such as glass, ceramics, or the like. The insulating member 16 is, for example, disposed at a position in contact with the pin member 15 at the end portion 11a of the outer electrode 11 on the side in the X1 direction, as depicted in FIG. 16, and inhibits the inner electrode 12 and the dielectric 13 from moving in the X1 direction. That is, the insulating member 16 inhibits the inner electrode 12 and the dielectric 13 from moving in the X1 direction farther than the insulating member 16, for example.

Specifically, the insulating member 16 is disposed, for example, at a position on the side in the X2 direction relative to the pin member 15 and in contact with the pin member 15. The insulating member 16 has a shape that allows the insulating member 16 to come into contact with at least a part of the end portion 12c when the inner electrode 12 and the dielectric 13 move in the X2 direction, for example.

This configuration allows the ozone-generating apparatus 200 in this variation to prevent electrical connection between the inner electrode 12 and the pin member 15 even if (the end portion 12c of) the inner electrode 12 is disposed near the pin member 15, for example.

Ozone-Generating Apparatus 300 in Third Embodiment

Figures 17A, 17B:
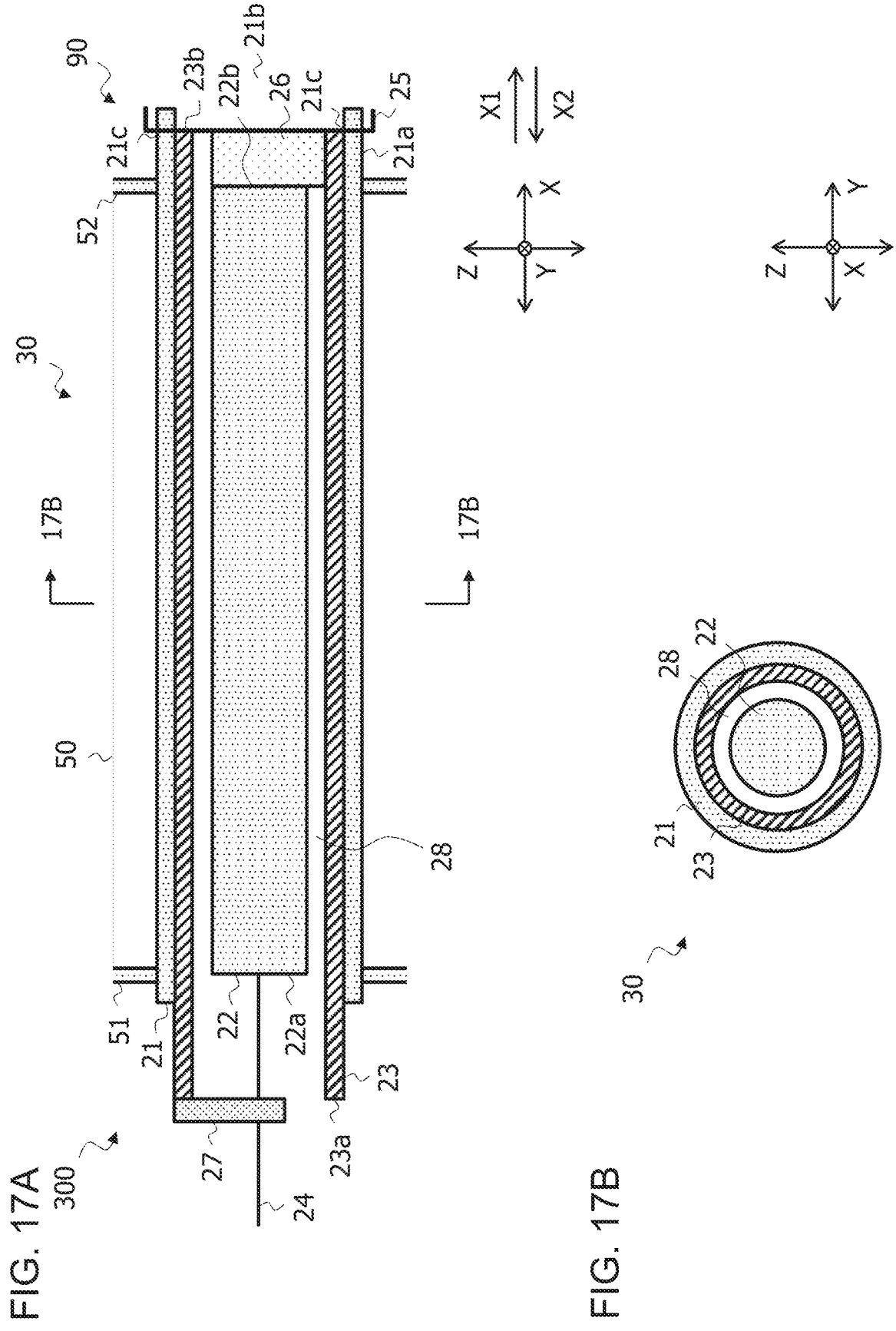
FIGS. 17A and 17B are diagrams illustrating a configuration example of a discharge tube 30 in the third embodiment.

Next, an ozone-generating apparatus 300 in the third embodiment is described. FIG. 17 is a diagram illustrating a configuration example of a discharge tube 30 in the third embodiment. Specifically, FIG. 17A is a side cross-sectional view of the discharge tube 30, and FIG. 17B is a 17B-17B cross-sectional view of the discharge tube 30.

Unlike the ozone-generating apparatus 100 in the first embodiment, the ozone-generating apparatus 300 has a plurality of discharge tubes 30 instead of the plurality of discharge tubes 10, as depicted in FIG. 17. Similar to the ozone-generating apparatus 100 in the first embodiment, the ozone-generating apparatus 300 may also include the housing 40, the cooling unit 50, and the AC power source 60, for example.

As in the case illustrated in FIG. 1 and other figures, each of the discharge tubes 30 produces the ozone gas B by means of barrier discharge in response to the inflow of the source gas A in the X2 direction, and releases the produced ozone gas B in the X1 direction.

Specifically, each of the discharge tubes 30 includes, for example, an outer electrode 21, an inner electrode 22, a dielectric 23, a power supply member 24, a pin member 25 (hereinafter also referred to as a member 25), an insulating member 26, and a power supply ribbon 27 (hereinafter also referred to as a connecting member 27), as depicted in FIGS. 17A and 17B.

The outer electrode 21 has a cylindrical shape that extends from the side in the X2 direction toward the side in the X1 direction and has both ends open, as in the case illustrated in FIG. 2 and other figures, for example. Hereinafter, an end portion of the outer electrode 21 on the side in the X1 direction is also referred to as an end portion 21a.

The inner electrode 22 has a cylindrical shape that extends from the side in the X2 direction toward the side in the X1 direction and is coaxial with the outer electrode 21, as in the case illustrated in FIG. 2 and other figures, for example. Hereinafter, an end portion of the inner electrode 22 on the side in the X2 direction is also referred to as an end portion 22a or a first end 22a, and an end portion of the inner electrode 22 on the side in the X1 direction is also referred to as an end portion 22b or a second end 22b.

The dielectric 23 is, for example, a glass tube having a cylindrical shape coaxial with the outer electrode 21, extends from the side in the X2 direction toward the side in the X1 direction, and has both ends open. The dielectric 23 is disposed so as to be adhered to the inner circumferential face of the outer electrode 21, for example. Hereinafter, an end portion of the dielectric 23 on the side in the X2 direction is also referred to as an end portion 23a or a first end 23a, and an end portion of the dielectric 23 on the side in the X1 direction is also referred to as an end portion 23b or a second end 23b.

Specifically, the dielectric 23 is disposed such that, for example, a gap functioning as a discharge space 28 is formed between the dielectric 23 and the outer circumferential face of the inner electrode 22.

The power supply member 24 is, for example, a bar-shaped power supply rod. The power supply member 24 extends in the X-axis direction from the side in the X2 direction (the power supply line 61) to the end portion 22a of the inner electrode 22 on the side in the X2 direction, and applies a voltage (AC voltage) from the AC power source 60 to the inner electrode 22 by electrically connecting to the inner electrode 22.

That is, the dielectric 23 in the present embodiment has both ends open, for example. The outer side of the dielectric 23 of the discharge tube 30 is in contact with the inner side of the outer electrode 21. The inner side of the dielectric 23 faces the outer side of the inner electrode 22 with a predetermined distance therebetween.

The pin member 25 is, for example, in contact with the outer electrode 21 at the end portion 21a (opening portion 21b) of the outer electrode 21 on the side in the X1 direction due to extending in the radial direction of the outer electrode 21, and inhibits the inner electrode 22 from moving in the X1 direction. That is, the pin member 25 inhibits the inner electrode 22 from moving in the X1 direction farther than the pin member 25, as in the case illustrated in FIG. 2 and other figures, for example.

Specifically, the outer electrode 21 has, for example, two holes 21c along the radial direction at the end portion 21a (a wall forming the end portion 21a). Two ends of the pin member 25 are each inserted into a corresponding one of the two holes 21c, for example. The two ends of the pin member 25 are located outward of the outer electrode 21, and are bent in a direction (e.g. the X1 direction) different from the extending direction (radial direction) of the pin member 25, for example.

The insulating member 26 is, for example, an insulator such as glass, ceramics, or the like. The insulating member 26 is, for example, in contact with the pin member 25 at the end portion 21a of the outer electrode 21 on the side in the X1 direction and disposed at a position facing the end portion 22b of the inner electrode 22 to inhibit the inner electrode 22 from moving in the X1 direction. That is, the insulating member 26 inhibits the inner electrode 22 from moving in the X1 direction farther than the insulating member 26, as in the case illustrated in FIG. 2 and other figures, for example.

The power supply ribbon 27 is, for example, disposed at a position facing the end portion 23a of the dielectric 23, and inhibits the inner electrode 22 from moving in the X2 direction. That is, the power supply ribbon 27 inhibits the inner electrode 22 from moving in the X2 direction farther than the power supply ribbon 27 as in the case illustrated in FIG. 4 and other figures, for example. Specifically, the power supply ribbon 27 is, for example, a conductive plate-shaped member.

That is, the pin member 25 and the insulating member 26 in the discharge tube 30 in the present embodiment can inhibit the inner electrode 22 from moving in the X1 direction. Further, the power supply ribbon 27 in the discharge tube 30 can inhibit the inner electrode 22 from moving in the X2 direction.

This configuration makes it possible for the ozone-generating apparatus 300 in the present embodiment to inhibit the inner electrode 22 from moving (in the X1 direction or the X2 direction) during operation and transportation of the ozone-generating apparatus 300, for example, as in the case of the ozone-generating apparatus 100.

The AC power source 60 in the ozone-generating apparatus 300 in the present embodiment can be electrically connected to each inner electrode 22 by connecting the plurality of power supply ribbons 27 to form the chain member 70, for example.

The power supply members 24 in the ozone-generating apparatus 300 in the present embodiment can be connected while maintaining the extending direction of each power supply member 24 by connecting a plurality of power supply ribbons 27 to form the chain member 70 as illustrated in FIG. 5, even in the first and second cases illustrated in FIG. 5. This configuration can electrically connect the AC power source 60 to the inner electrodes 22 in the ozone-generating apparatus 300 even when the extending directions of the power supply members 24 are not fixed, for example.

Note that the ozone-generating apparatus 300 in the present embodiment may also include the installation member 41 as in the case illustrated in FIG. 10, for example. The ozone-generating apparatus 300 in the present embodiment may also include the fixation member 80 as in the case illustrated in FIG. 11, for example. The ozone-generating apparatus 300 in the present embodiment may include the clip member 5a or 5b instead of the pin member 25 as in the case illustrated in FIG. 12 or 13, for example. The ozone-generating apparatus 300 in the present embodiment may have, for example, the chain member 70 illustrated in FIG. 14.

| REFERENCE SIGNS LIST | |
|---|---|
| 1: OUTER ELECTRODE | 1a: END PORTION |
| 1b: OPENING PORTION | 1c: HOLE |
| 2: INNER ELECTRODE | 2a: END PORTION |
| 2b: END PORTION | 3: DIELECTRIC |
| 3a: END PORTION | 3b: END PORTION |
| 4: POWER SUPPLY MEMBERS | 5: PIN MEMBER |
| 5a: CLIP MEMBER | 5b: CLIP MEMBER |
| 6: INSULATING MEMBER | 7: POWER SUPPLY RIBBONS |
| 8: DISCHARGE SPACE | 9: DISCHARGE SPACE |
| 10: DISCHARGE TUBE | 11: OUTER ELECTRODE |
| 11a: END PORTION | 11b: OPENING PORTION |
| 11c: HOLE | 12: INNER ELECTRODE |
| 12a: END PORTION | 12b: END PORTION |
| 12c: END PORTION | 13: DIELECTRIC |
| 13a: END PORTION | 13c: END PORTION |
| 14: POWER SUPPLY MEMBERS | 15: PIN MEMBER |
| 16: INSULATING MEMBER | 17: POWER SUPPLY RIBBONS |
| 18: DISCHARGE SPACE | 20: DISCHARGE TUBE |
| 21: OUTER ELECTRODE | 21a: END PORTION |
| 21b: OPENING PORTION | 21c: HOLE |
| 22: INNER ELECTRODE | 22a: END PORTION |
| 22b: END PORTION | 23: DIELECTRIC |
| 23a: END PORTION | 23b: END PORTION |
| 24: POWER SUPPLY MEMBERS | 25: PIN MEMBER |
| 26: INSULATING MEMBER | 27: POWER SUPPLY RIBBONS |
| 28: DISCHARGE SPACE | 30: DISCHARGE TUBE |
| 40: HOUSING | 40a: OUTER WALL |
| 40b: INNER WALL | 41: INSTALLATION MEMBER |
| 50: COOLING UNIT | 51: TUBE SHEET |

22

-continued

| REFERENCE SIGNS LIST | |
|---|---|
| 52: TUBE SHEET | 60: POWER SOURCE |
| 61: POWER SUPPLY LINE | 70: CHAIN MEMBER |
| 80: FIXATION MEMBER | 90: INHIBITING MEMBER |

The invention claimed is:

1. An ozone-generating apparatus comprising:
   a plurality of discharge tubes each including: a first electrode having a tubular shape extending along a first axis; a second electrode extending along the first axis; a dielectric extending along the first axis and disposed between the first electrode and the second electrode, the plurality of discharge tubes including a first discharge tube and a second discharge tube adjacent to the first discharge tube; and a power supply member electrically connecting the second electrode and extending along the first axis; and
   a conductive plate-shaped member electrically connecting the second electrode of the first discharge tube to the second electrode of the second discharge tube, wherein
   the dielectric has a tubular shape and is disposed such that a gap defining a discharge space is formed between the dielectric and an inner circumferential face of the first electrode and such that a gap defining a discharge space is formed between the dielectric and an outer circumferential face of the second electrode,
   the conductive plate-shaped member has a plurality of holes into which the power supply members of the first discharge tube and the second discharge tube are respectively inserted and fixed; and
   the conductive plate-shaped member is disposed at an axial end of the dielectric of the first discharge tube and an axial end of the dielectric of the second discharge tube to oppose an end surface of each dielectric along the first axis.

2. The ozone-generating apparatus according to claim 1, further comprising:
   a plurality of the conductive plate-shaped members including a first conductive plate-shaped member and a second conductive plate-shaped member, wherein
   the first conductive plate-shaped member electrically connects the second electrode of the first discharge tube to the second electrode of the second discharge tube, and
   the second conductive plate-shaped member electrically connects the second electrode of the first discharge tube to the second electrode of a third discharge tube, which is included in the plurality of discharge tubes and adjacent to the first discharge tube.

3. The ozone-generating apparatus according to claim 2, wherein
   the plurality of the conductive plate-shaped members includes N (N is an integer of one or more) second conductive plate-shaped members and (N+1) or more first conductive plate-shaped members.

4. The ozone-generating apparatus according to claim 2, wherein
   the first discharge tube, the second discharge tube, and the third discharge tube each have a power supply member electrically connecting the second electrode to the conductive plate-shaped member, and
   the first discharge tube, the second discharge tube, and the third discharge tube are disposed along a predetermined linear direction, and a first linear direction of a line connecting a contact point between the power supply member of the first discharge tube and the first conductive plate-shaped member to a contact point between the power supply member of the second discharge tube and the first conductive plate-shaped member, a second linear direction of a line connecting a contact point between the power supply member of the first discharge tube and the second conductive plate-shaped member to a contact point between the power supply member of the third discharge tube and the second conductive plate-shaped member are different from the predetermined linear direction.

5. The ozone-generating apparatus according to claim 1, wherein the dielectric is movable along the first axis.

* * * * *